US006676878B2

United States Patent
O'Brien et al.

(10) Patent No.: US 6,676,878 B2
(45) Date of Patent: Jan. 13, 2004

(54) LASER SEGMENTED CUTTING

(75) Inventors: James N. O'Brien, Bend, OR (US); Lian-Cheng Zou, Portland, OR (US); Yunlong Sun, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 30 days.

(21) Appl. No.: 10/165,428

(22) Filed: Jun. 6, 2002

(65) Prior Publication Data

US 2002/0190435 A1 Dec. 19, 2002

Related U.S. Application Data

(63) Continuation-in-part of application No. 10/017,497, filed on Dec. 14, 2001.
(60) Provisional application No. 60/265,556, filed on Jan. 31, 2001, and provisional application No. 60/297,218, filed on Jun. 8, 2001.

(51) Int. Cl.$^7$ .......................... B23K 26/04; C04B 41/91
(52) U.S. Cl. .................. 264/400; 264/482; 219/121.62; 219/121.67; 219/121.69; 219/121.8; 219/121.81; 219/121.85
(58) Field of Search ................................ 264/400, 482; 219/121.62, 121.67, 121.71, 121.85, 121.75, 121.8, 121.69, 121.81

(56) References Cited

U.S. PATENT DOCUMENTS

| | | | |
|---|---|---|---|
| 4,547,651 A | 10/1985 | Maruyama | 219/121 |
| 5,057,664 A | 10/1991 | Johnson et al. | 219/121.69 |
| 5,751,585 A | 5/1998 | Cutler et al. | 364/474.03 |
| 5,779,753 A | * 7/1998 | Vetter et al. | |
| 5,841,099 A | 11/1998 | Owen et al. | 219/121.69 |
| 5,843,363 A | 12/1998 | Mitwalsky et al. | 264/400 |
| 6,130,009 A | 10/2000 | Smith et al. | 430/1 |
| 6,255,621 B1 | 7/2001 | Lundquist et al. | 219/121.72 |
| 2001/0009250 A1 | 7/2001 | Herman et al. | 219/121.69 |
| 2002/0033558 A1 | 3/2002 | Fahey et al. | 264/400 |

FOREIGN PATENT DOCUMENTS

| | | | | |
|---|---|---|---|---|
| JP | 3-180807 | | 4/2001 | B23K/26/00 |
| WO | WO 02/060636 A1 | | 8/2002 | B23K/26/38 |

OTHER PUBLICATIONS

Written Opinion concerning corresponding International Application No. PCT/US02/17908.
Written Opinion concerning corresponding International Application No. PCT/US02/00867.
Written Opinion concerning corresponding International Application No. PCT/US02/00867.

* cited by examiner

Primary Examiner—Stefan Staicovici
(74) Attorney, Agent, or Firm—Stoel Rives LLP

(57) ABSTRACT

UV laser cutting throughput through silicon and like materials is improved by dividing a long cut path (112) into short segments (122), from about 10 $\mu$m to 1 mm. The laser output (32) is scanned within a first short segment (122) for a predetermined number of passes before being moved to and scanned within a second short segment (122) for a predetermined number of passes. The bite size, segment size (126), and segment overlap (136) can be manipulated to minimize the amount and type of trench backfill. Real-time monitoring is employed to reduce rescanning portions of the cut path 112 where the cut is already completed. Polarization direction of the laser output (32) is also correlated with the cutting direction to further enhance throughput. This technique can be employed to cut a variety of materials with a variety of different lasers and wavelengths.

51 Claims, 10 Drawing Sheets

FIG. 1 (PRIOR ART)
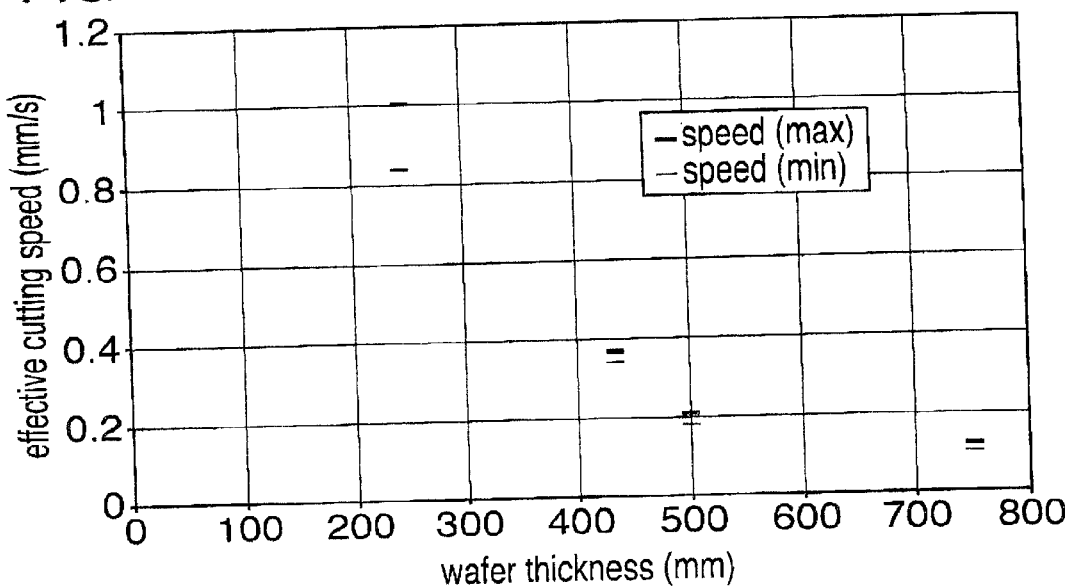
FIG. 2A
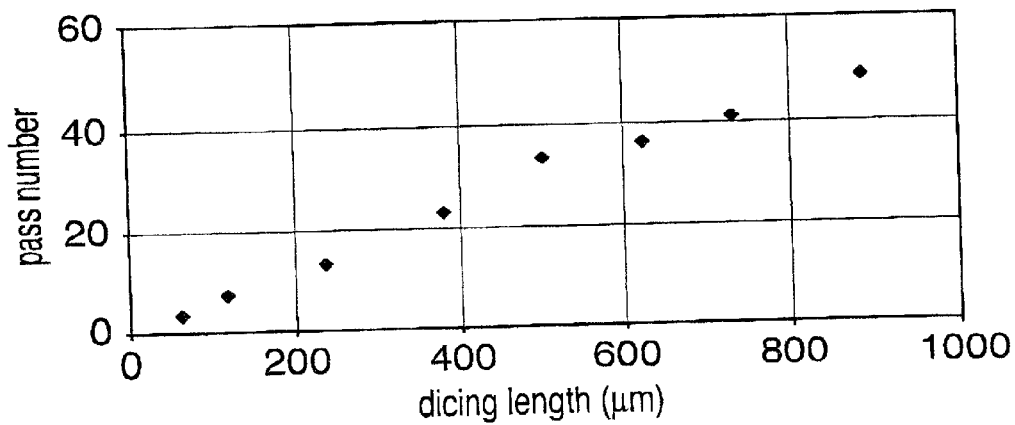
FIG. 2B

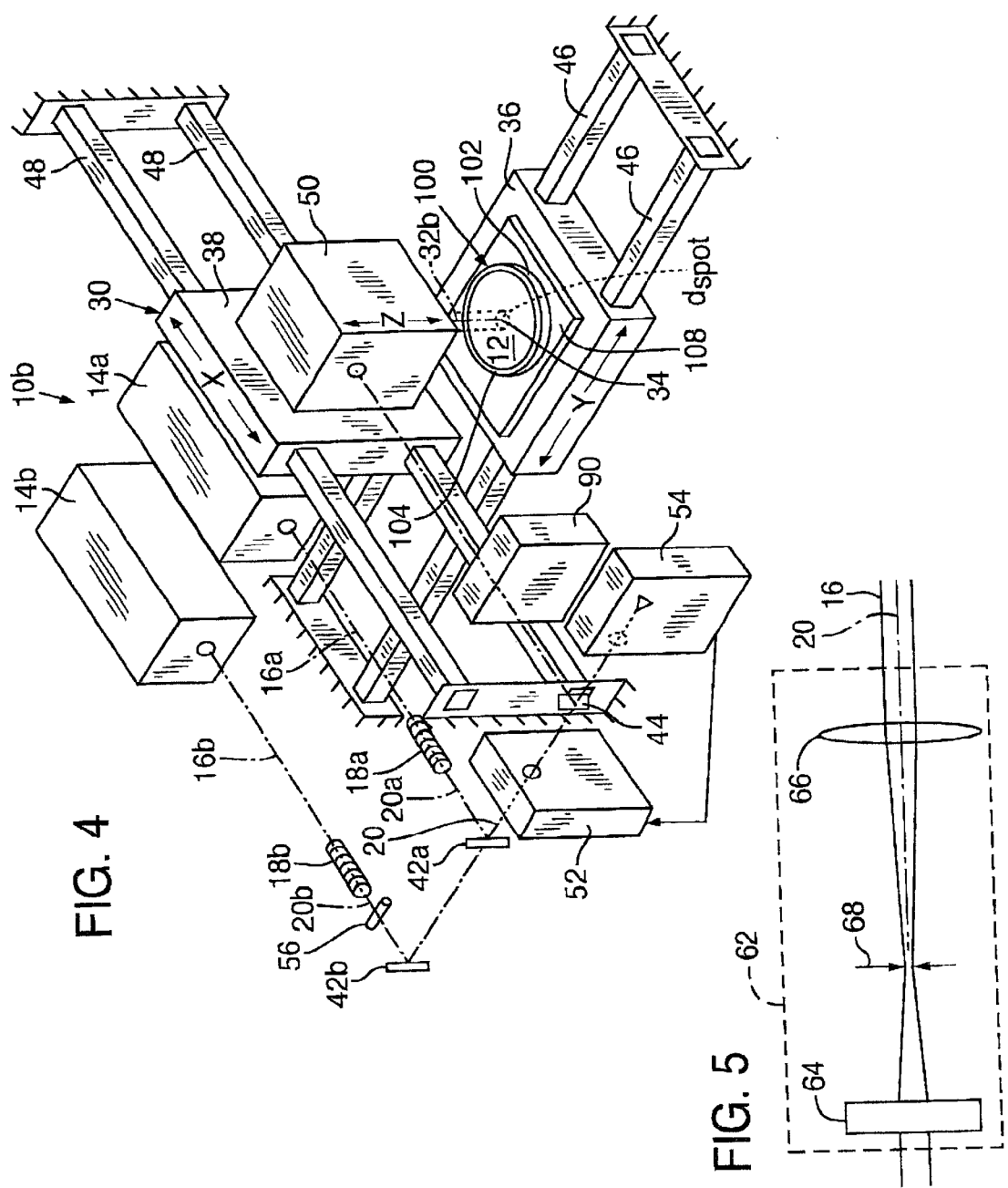

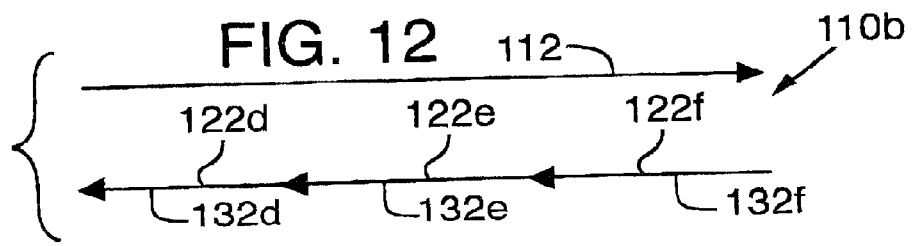
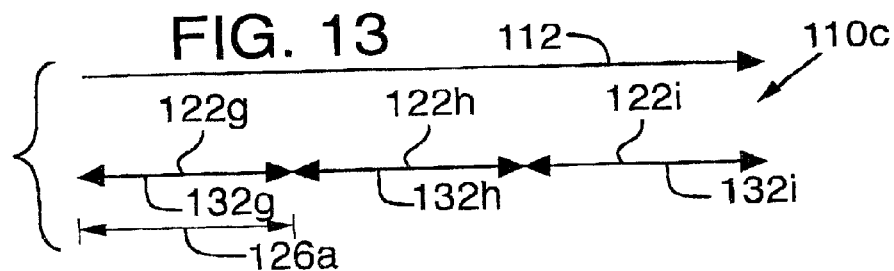
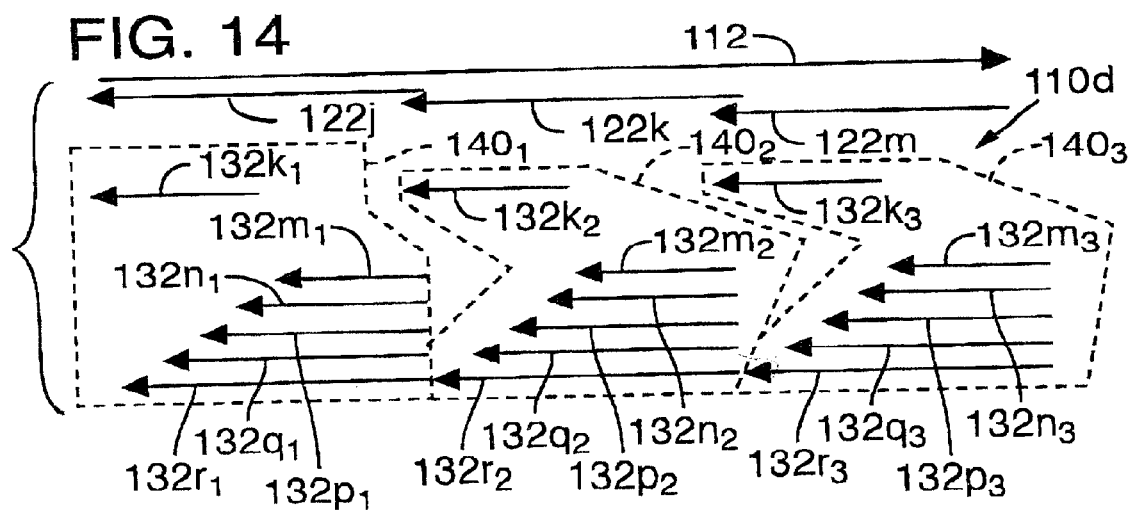

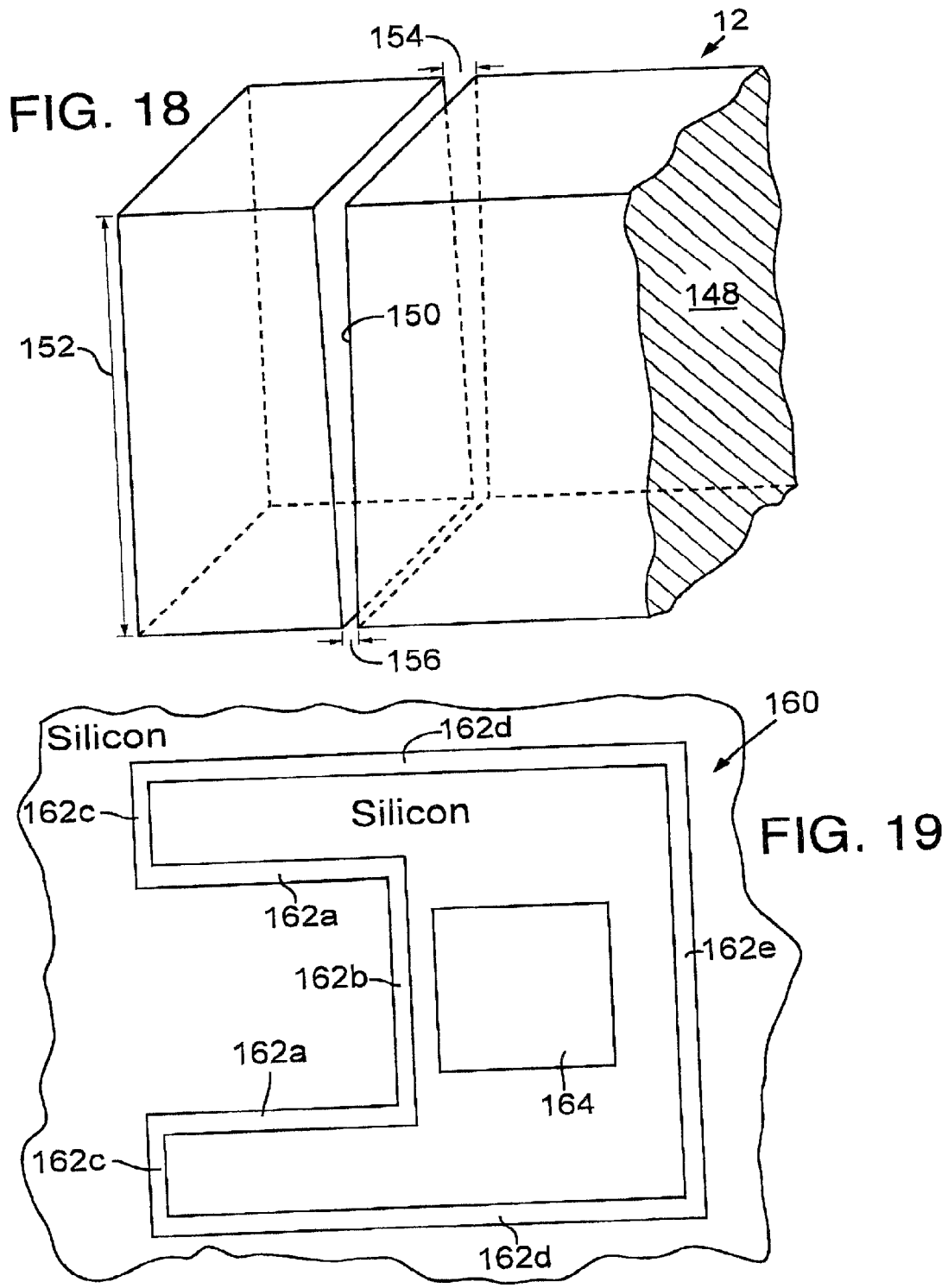

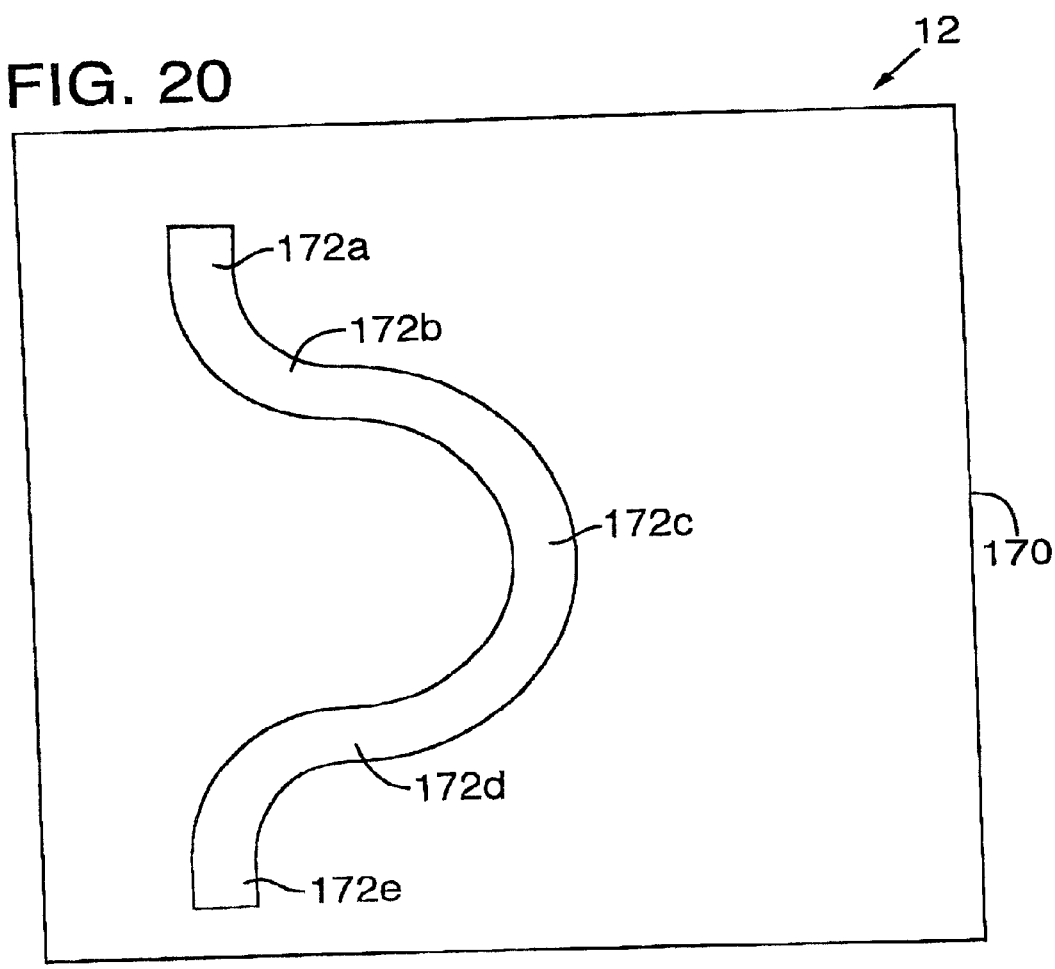

LASER SEGMENTED CUTTING

RELATED APPLICATIONS

This patent application derives priority from U.S. Provisional Application No. 60/297,218, filed Jun. 8, 2001, and is a CIP of U.S. patent application Ser. No. 10/017,497, filed Dec. 14, 2001, which claims priority from U.S. Provisional Application No. 60/265,556, filed Jan. 31, 2001.

FEDERALLY SPONSORED RESEARCH OR DEVELOPMENT

Not Applicable

COPYRIGHT NOTICE

© 2001 Electro Scientific Industries, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention relates to a laser cutting and, in particular, to a method and/or system for advantageous beam positioning and scanning to improve the throughput of laser cutting in silicon or other materials.

BACKGROUND OF THE INVENTION

FIG. 1 is a simplified representation of a traditional continuous cutting profile 8. Traditional laser cutting employs sequentially overlapping spots from consecutive laser pulses to continuously scan through an entire cut path. Numerous complete passes are performed until the target is severed along the entire cut path. When the target material is thick, many passes (in some cases over 100 passes) may be necessary to complete the cutting process, particularly with limited laser power.

A method for increasing laser cutting throughput for thick materials is, therefore, desirable.

SUMMARY OF THE INVENTION

An object of the present invention is, therefore, to provide a method and/or system for improving the throughput for laser cutting silicon or other materials.

For convenience, the term cutting may be used generically to include trenching (cutting that does not penetrate the full depth of a target workpiece) and throughcutting, which includes slicing (often associated with wafer row separation) or dicing (often associated with part singulation from wafer rows). Slicing and dicing may be used interchangeably in the context of this invention.

FIG. 2A is a graph showing that for conventional long continuous throughcuts, the effective dicing speed decreases very quickly as silicon wafer thickness increases. Thus, as thickness increases, the number of laser passes increases almost exponentially and consequently exponentially decreases the dicing speed. The cutting width may be on the order of only a few tens of microns ($\mu$m), and the wafer thickness is typically much greater than the cutting width.

Traditional laser cutting profiles may suffer from trench backfill of laser ejected material. When the wafer thickness is increased, this backfill becomes much more severe and may be largely responsible for the dramatic decrease in dicing speed. Moreover, for some materials under many process conditions, the ejected backfill material may be more difficult to remove on subsequent passes than the original target material. Because trench backfill with laser ejected material has a somewhat random nature, the degree of backfill along any portion of a traditional cutting profile may be large or small such that some portions of the cutting path may be cut through (opened) in fewer passes than other portions of the cutting path. Traditional laser cutting techniques ignore these phenomena and continuously scan an entire cut path, including areas that may already be opened, with complete passes of laser output until the target material is severed along the entire cut path.

As an example, a UV laser, having laser output power of only about 4 W at 10 kHz, requires about 150 passes to make a complete cut through a 750 $\mu$m-thick silicon wafer using a conventional laser cutting profile. The conventional cutting profiles typically traverse the entire lengths of wafers, which typically have diameters of about 200–305 mm. The resulting cutting rate is too slow for commercial dicing applications of silicon this thick. Although the segmented cutting technique can be employed to cut any laser-receptive material and employed at any laser wavelength, the segmented cutting technique is particularly useful for laser processing at wavelengths where laser power is limited, such as solid-state-generated V, and particularly where such wavelengths provide the best cutting quality for a given material. For example, even though IR lasers tend to provide much more available output power, IR wavelengths tend to crack or otherwise damage silicon, alumina, AlTiC and other ceramic or semiconductor materials. UV is most preferred for cutting a silicon wafer for example.

U.S. patent application Ser. No. 09/803,382 ('382 application) of Fahey et al., describes a UV laser system and a method for separating rows or singulating sliders or other components. These methods include various combinations of laser and saw cutting directed at one or both sides of a wafer and various techniques for edge modification.

U.S. patent application derives priority from U.S. Provisional Application No. 60/297,218, filed Jun. 8, 2001, and is a CIP of U.S. patent application Ser. No. 10/017,497, filed Dec. 14, 2001, which claims priority from U.S. Provisional Application No. 60/265,556, filed Jan. 31, 2001.

FIG. 2B is a graph showing the results of a recent experiment comparing the number of passes to complete a dicing cut versus the cutting length of the cutting profile in 750 $\mu$m-thick silicon. A wedge or "pie slice" was taken from a 750 $\mu$m-thick silicon wafer, and cutting profiles of different lengths were executed from edge to edge. The experiment revealed that shorter cutting profiles could be diced with fewer passes.

The present invention, therefore, separates long cuts into a cutting profile containing small segments that minimize the amount and type of trench backfill. For through cutting or trench cutting in thick silicon, for example, these segments are preferably from about 10 $\mu$m to 1 mm, more preferably from about 100 $\mu$m to 800 $\mu$m, and most preferably from about 200 $\mu$m to 500 $\mu$m. Generally, the laser beam is scanned within a first short segment for a predetermined number of passes before being moved to and scanned within a second short segment for a predetermined number of passes. The beam spot size, bite size, segment size, and segment overlap can be manipulated to minimize the amount and type of trench backfill. A few scans across the entire cut path can be optionally employed in the process, particularly before and/or after the segment cutting steps, to maximize the throughput and/or improve the cut quality.

The present invention also improves throughput and quality by optionally employing real-time monitoring and selective segment scanning to reduce backfill and overprocessing. The monitoring can eliminate rescanning portions of the cut path where the cut is already completed. In addition, polarization of the laser beam can be correlated with the cutting direction to further enhance throughput. These techniques generate less debris, decrease the heat affected zone (HAZ) surrounding the cutting area or kerf, and produce a better cut quality.

Although the present invention is presented herein only by way of example to silicon wafer cutting, skilled persons will appreciate that the segmented cutting techniques described herein may be employed for cutting a variety of target materials with the same or different types of lasers having similar or different wavelengths.

Additional objects and advantages of this invention will be apparent from the following detailed description of preferred embodiments thereof, which proceeds with reference to the accompanying drawings.

BRIEF DESCRIPTION OF THE DRAWINGS

FIG. 1 is a simplified representation of a traditional continuous cutting profile.

FIG. 2A is a graph showing effective dicing speed versus silicon wafer thickness for traditional continuous cuts.

FIG. 2B is a graph showing the number of passes to complete a cut versus the cutting length in silicon.

FIG. 4 is a simplified pictorial diagram of an alternative preferred laser system for performing segmented cutting in accordance with the present invention.

FIG. 5 is a simplified pictorial diagram of an optional imaged optics module that may be used in a laser system for performing segmented cutting in accordance with the present invention.

FIG. 12 is a simplified representation of an alternative segmented cutting profile produced in accordance with the present invention.

FIG. 13 is a simplified representation of an alternative segmented cutting profile produced in accordance with the present invention.

FIG. 14 is a simplified representation of an alternative segmented cutting profile produced in accordance with the present invention.

FIG. 18 is a representative illustration of a trench pattern formed by segmented cutting processing of silicon.

FIG. 19 is a representative illustration of patterning of a MEMS device by a segmented cutting process on a semiconductor wafer.

FIG. 20 is a representative illustration of an AWG device fabricated by a segmented cutting process on a semiconductor wafer.

DETAILED DESCRIPTION OF THE PREFERRED EMBODIMENT

Figure 3:
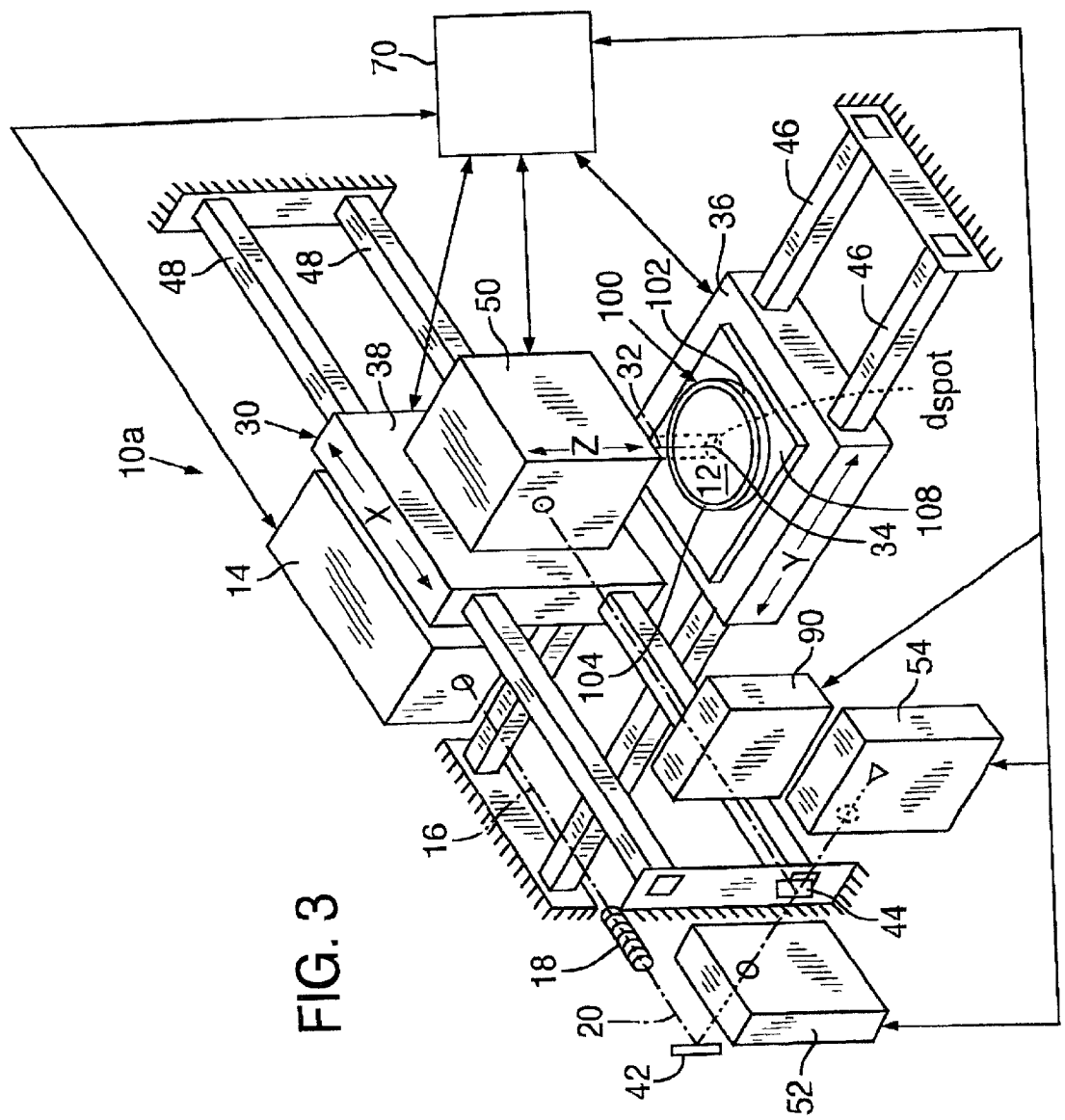
FIG. 3 is a simplified partly pictorial and partly schematic diagram of an exemplary laser system for performing segmented cutting in accordance with the present invention.

FIGS. 3 and 4 illustrate alternative embodiments of respective exemplary laser processing systems 10a and 10b (generically 10) utilizing a compound beam positioning system 30 equipped with a wafer chuck assembly 100 that can be employed for performing segmented cutting, such as trenching, slicing, or dicing semiconductor workpieces 12, in accordance with the present invention. With reference to FIGS. 3 and 4, an exemplary embodiment of a laser system 10 includes a Q-switched, diode-pumped (DP), solid-state (SS) UV laser 14 that preferably includes a solid-state lasant such as Nd:YAG, Nd:YLF, or Nd:YVO$_4$. Laser 14 preferably provides harmonically generated UV laser output 16 of one or more laser pulses at a wavelength such as 355 m (frequency tripled Nd:YAG), 266 nm (frequency quadrupled Nd:YAG), or 213 nm (frequency quintupled Nd:YAG) with primarily a TEM$_{00}$ spatial mode profile.

In a preferred embodiment, laser 14 includes a Model 210-V06 (or Model Q301) Q-switched, frequency-tripled Nd:YAG laser, operating at about 355 nm with 5 W at the work surface, and commercially available from Lightwave Electronics of Mountain View, Calif. This laser has been employed in the ESI Model 2700 micromachining system available from Electro Scientific Industries, Inc. of Portland, Oreg. In an alternative embodiment, a Lightwave Electronics Model 210-V09 (or Model Q302) Q-switched, frequency-tripled Nd:YAG laser, operating at about 355 nm may be employed in order to employ high energy per pulse at a high pulse repetition frequency (PRF). Details of another exemplary laser 22 are described in detail in U.S. Pat. No. 5,593,606 of Owen et al. Skilled persons will appreciate that other lasers could be employed and that other wavelengths are available from the other listed lasants. Although laser cavity arrangements, harmonic generation, and Q-switch operation, and positioning systems 30 are all well known to persons skilled in the art, certain details of some of these components will be presented within the discussions of the exemplary embodiments.

Although Gaussian may be used to describe the irradiance profile of laser output 16, skilled persons will appreciate that most lasers 14 do not emit perfect Gaussian output 16 having a value of M$^2$=1. For convenience, the term Gaussian is used herein to include profiles where M$^2$ is less than or equal to about 1.5, even though $M^2$ values of less than 1.3 or 1.2 are preferred. A typical optical system produces a Gaussian spot size of about 10 µm, but this may easily be modified to be from about 2–100 µm. Alternatively, an optical system producing a top hat beam profile and or employing a mask, such as described later herein, may be used to create a predetermined spot size. The pulse energy used for cutting silicon using this focused spot size is greater than 200 µJ, and preferably greater than 800 µJ, per pulse at pulse repetition frequencies greater than 5 kHz and preferably above 10 kHz. An exemplary setting provides 9.1 W at 13 kHz. An exemplary laser pulsewidth measured at the full width half-maximum points is less than 80 ns. Alternative and/or complementary exemplary process windows include, but are not limited to, about 3.5–4.5 W UV at the work surface at about 10 kHz through about 20–30 W UV at 20–30 kHz, such as 15 W at 15 kHz.

UV laser output 16 is optionally passed through a variety of well-known expansion and/or collimation optics 18, propagated along an optical path 20, and directed by a beam positioning system 30 to impinge laser system output 32 of one or more pulses on a desired laser target position 34 on workpiece 12 such as a silicon wafer. An exemplary beam positioning system 30 may include a translation stage positioner that may employ at least two transverse stages 36 and 38 that support, for example, X, Y, and/or Z positioning mirrors 42 and 44 and permit quick movement between target positions 34 on the same or different workpieces 12.

Figure 7:
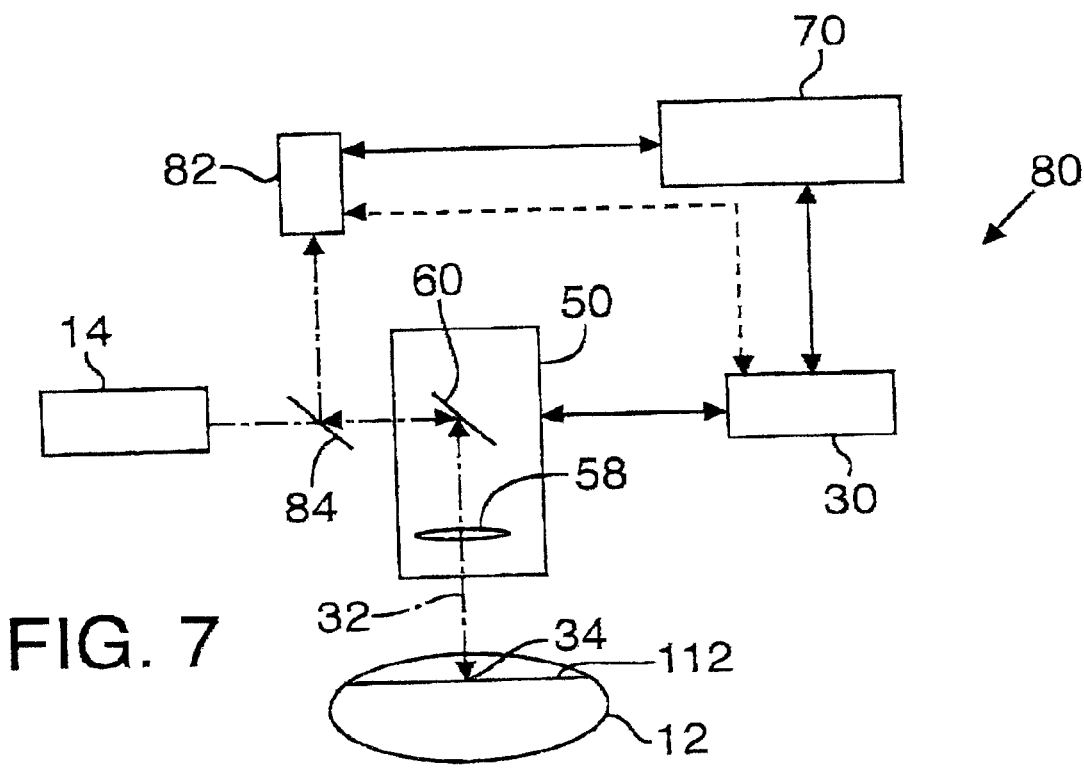
FIG. 7 is a simplified representation of a real time cut status monitor optionally employed by an exemplary laser system for performing segmented cutting in accordance with the present invention.

In an exemplary embodiment, the translation stage positioner is a split-axis system where a Y stage 36, typically moved by linear motors along rails 46, supports and moves workpiece 12, and an X stage 38, typically moved by linear motors along rails 48, supports and moves a fast positioner 50 and associated focusing lens(es) or other optics 58 (FIG. 7). The Z dimension between X stage 38 and Y stage 36 may also be adjustable. The positioning mirrors 42 and 44 align the optical path 20 through any turns between laser 14 and fast positioner 50, which is positioned along the optical path 20. The fast positioner 50 may for example employ high resolution linear motors or a pair of galvanometer mirrors 60 (FIG. 7) that can effect unique or repetitive processing operations based on provided test or design data. The stages 36 and 38 and positioner 50 can be controlled and moved independently or coordinated to move together in response to panelized or unpanelized data. A split axis positioning system 30 is preferred for use in large area of travel applications, such as cutting 8" and especially 12" wafers.

Fast positioner 50 may also include a vision system that can be aligned to one or more fiducials on the surface of the workpiece 12. Beam positioning system 30 can employ conventional vision or beam to work alignment systems that work through objective lens 58 or off axis with a separate camera and that are well known to skilled practitioners. In one embodiment, an HRVX vision box employing Freedom Library software in a positioning system 30 sold by Electro Scientific Industries, Inc. is employed to perform alignment between the laser system 10 and the target positions 34 on the workpiece 12. Other suitable alignment systems are commercially available. The alignment systems preferably employ bright-field, on-axis illumination, particularly for specularly reflecting workpieces like lapped or polished wafers.

For laser cutting, the beam positioning system 30 is preferably aligned to conventional typical saw cutting or other fiducials or a pattern on wafer surface. If the workpieces 12 are already mechanically notched, alignment to the cut edges is preferred to overcome the saw tolerance and alignment errors. Beam positioning system 30 preferably has alignment accuracy of better than about 3–5 µm, such that the center of the laser spot is within about 3–5 µm of a preferred cutting path, particularly for laser beam spot sizes such as 10–15 µm. For smaller spot sizes, the alignment accuracy may preferably be even better. For larger spot sizes, the accuracy can be less precise.

In addition, beam positioning system 30 may also employ non-contact, small-displacement sensors to determine Abbe errors due to the pitch, yaw, or roll of stages 36 and 38 that are not indicated by an on-axis position indicator, such as a linear scale encoder or laser interferometer. The Abbe error correction system can be calibrated against a precise reference standard so the corrections depend only on sensing small changes in the sensor readings and not on absolute accuracy of the sensor readings. Such an Abbe error correction system is described in detail in International Publication No. WO 01/52004 A1 published on Jul. 19, 2001 and U.S. Publication No. 2001-0029674 A1 published on Oct. 18, 2001. The relevant portions of the disclosure of the corresponding U.S. patent application Ser. No. 09/755,950 of Cutler are herein incorporated by reference.

Many variations of positioning systems 30 are well known to skilled practitioners and some embodiments of positioning system 30 are described in detail in U.S. Pat. No. 5,751,585 of Cutler et al. The ESI Model 2700 or 5320 micromachining systems available from Electro Scientific Industries, Inc. of Portland, Oreg. are exemplary implementations of positioning system 30. Other exemplary positioning systems such as a Model series numbers 27xx, 43xx, 44xx, or 53xx, manufactured by Electro Scientific Industries, Inc. in Portland, Oreg., can also be employed. Some of these systems which use an X–Y linear motor for moving the workpiece 12 and an X–Y stage for moving the scan lens are cost effective positioning systems for making long straight cuts. Skilled persons will also appreciate that a system with a single X–Y stage for workpiece positioning with a fixed beam position and/or stationary galvanometer for beam positioning may alternatively be employed. Those skilled in the art will recognize that such a system can be programmed to utilize toolpath files that will dynamically position at high speeds the focused UV laser system output pulses 32 to produce a wide variety of useful patterns, which may be either periodic or non-periodic.

An optional laser power controller 52, such as a half wave plate polarizer, may be positioned along optical path 20. In addition, one or more beam detection devices 54, such as photodiodes, may be downstream of laser power controller 52, such as aligned with a positioning mirror 44 that is adapted to be partly transmissive to the wavelength of laser output. 16. Beam detection devices 54 are preferably in communication with beam diagnostic electronics that convey signals to modify the effects of laser power controller 52.

Laser 14 and/or its Q-switch, beam positioning system 30 and/or its stages 36 and 38, fast positioner 50, the vision system, any error correction system, the beam detection devices 54, and/or the laser power controller 52 may be directly or indirectly coordinated and controlled by laser controller 70.

With reference to FIG. 4, laser system 10b employs at least two lasers 14a and 14b that emit respective laser outputs 16a and 16b that are linearly polarized in transverse directions and propagate along respective optical paths 20a and 20b toward respective reflecting devices 42a and 42b. An optional waveplate 56 may be positioned along optical path 20b. Reflecting device 42a is preferably a polarization sensitive beam combiner and is positioned along both optical paths 20a and 20b to combine laser outputs 16a and 16b to propagate along the common optical path 20.

Lasers 14a and 14b may be the same or different types of lasers and may produce laser outputs 16a and 16b that have the same or different wavelengths. For example, laser output 16a may have a wavelength of about 266 nm, and laser output 16b may have a wavelength of about 355 nm. Skilled persons will appreciate that lasers 14a and 14b may be mounted side by side or one on top of the other and both attached to one of the translation stages 36 or 38, or lasers 14a and 14b can also be mounted on separate independently mobile heads. The firing of lasers 14a and 14b is preferably coordinated by laser controller 70. Laser system 10b is capable of producing very high energy laser output pulses 32b. A particular advantage of the arrangement shown in FIG. 4 is to produce a combined laser output 32 impinging on the work surface having an increased energy per pulse which could be difficult to produce from a conventional single laser head. Such an increased energy per pulse can be particularly advantageous for ablating deep trenches, or slicing or dicing through thick silicon wafers or other workpieces 12.

Despite the substantially round profile of laser system output pulse 32, improved beam shape quality may be achieved with an optional imaged optics module 62 whereby unwanted beam artifacts, such as residual astigmatism or elliptical or other shape characteristics, are filtered spatially. With reference to FIG. 5, imaged optics module 62 may include an optical element 64, a lens 66, and an aperture mask 68 placed at or near the beam waist created by the optical element 64 to block any undesirable side lobes and peripheral portions of the beam so that a precisely shaped spot profile is subsequently imaged onto the work surface. In an exemplary embodiment, optical element 64 is a diffractive device or focusing lens, and lens 66 is a collimating lens to add flexibility to the configuration of laser system 10.

Varying the size of the aperture can control the edge sharpness of the spot profile to produce a smaller, sharper-edged intensity profile that should enhance the alignment accuracy. In addition, with this arrangement, the shape of the aperture can be precisely circular or also be changed to rectangular, elliptical, or other noncircular shapes that can be aligned parallel or perpendicular to a cutting direction. The aperture of mask 68 may optionally be flared outwardly at its light exiting side. For UV laser applications, mask 68 in imaged optics module 62 preferably comprises sapphire. Skilled persons will appreciate that aperture mask 68 can be used without optical elements 64 and 66.

In an alternative embodiment, optical element 64 includes one or more beam shaping components that convert laser pulses having a raw Gaussian irradiance profile into shaped (and focused) pulses that have a near-uniform "top hat" profile, or particularly a super-Gaussian irradiance profile, in proximity to an aperture mask 68 downstream of optical element 64. Such beam shaping components may include aspheric optics or diffractive optics. In one embodiment, lens 66 comprises imaging optics useful for controlling beam size and divergence. Skilled persons will appreciate that a single imaging lens component or multiple lens components could be employed. Skilled persons will also appreciate, and it is currently preferred, that shaped laser output can be employed without using an aperture mask 68.

In one embodiment, the beam shaping components include a diffractive optic element (DOE) that can perform complex beam shaping with high efficiency and accuracy. The beam shaping components not only transform the Gaussian irradiance profile to a near-uniform irradiance profile, but they also focus the shaped output to a determinable or specified spot size. Although a single element DOE is preferred, skilled persons will appreciate that the DOE may include multiple separate elements such as the phase plate and transform elements disclosed in U.S. Pat. No. 5,864,430 of Dickey et al., which also discloses techniques for designing DOEs for the purpose of beam shaping. The shaping and imaging techniques discussed above are described in detail in International Publication No. WO 00/73013 published on Dec. 7, 2000. The relevant portions of the disclosure of corresponding U.S. patent application Ser. No. 09/580,396 of Dunsky et al., filed May 26, 2000 are herein incorporated by reference.

Figure 6:
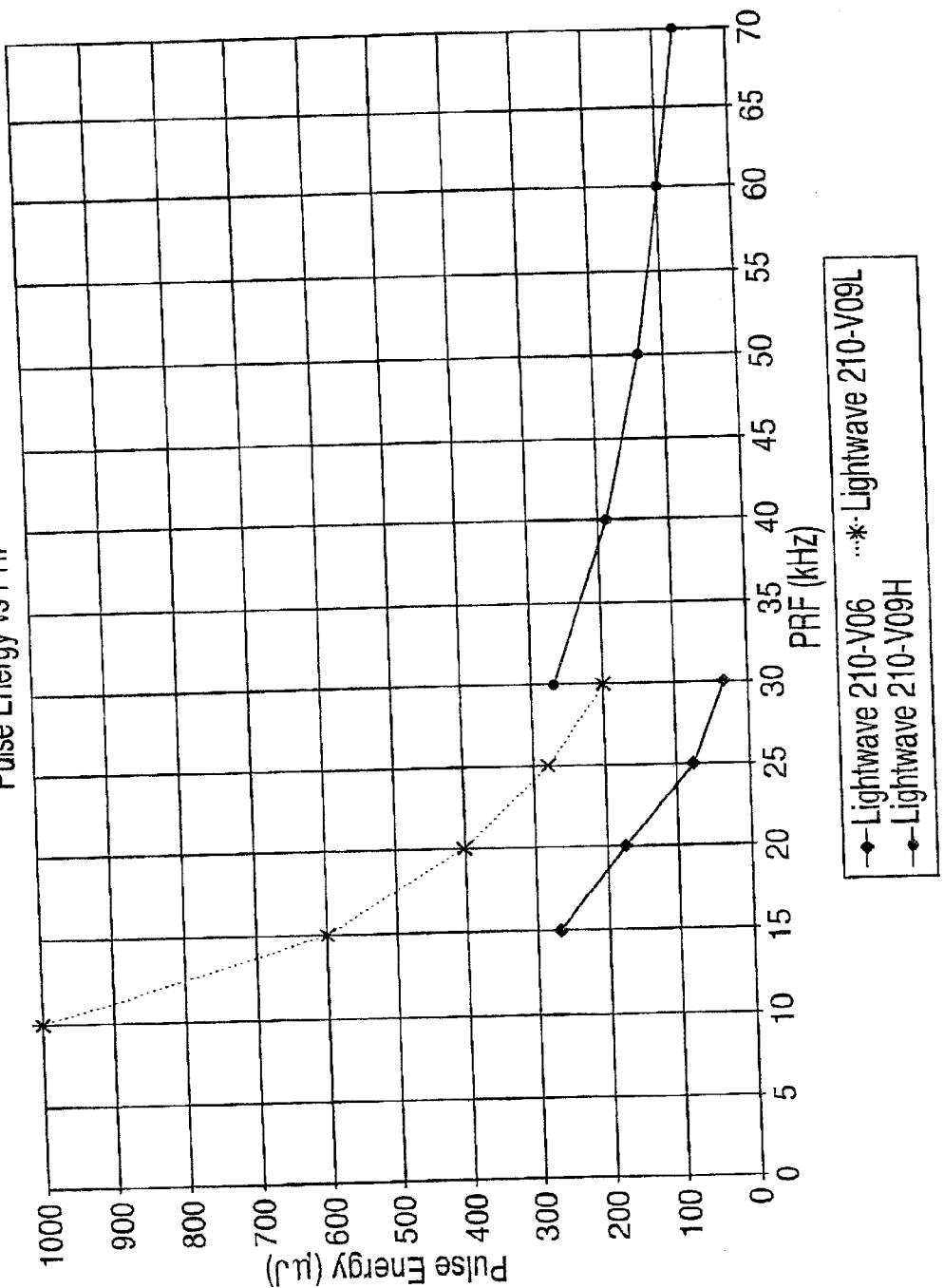
FIG. 6 is a graph displaying the characteristic relationship between pulse energy and pulse repetition frequency of the laser employed during practice of the invention.

For the purpose of providing increased flexibility in the dynamic range of energy per pulse, a fast response amplitude control mechanism, such as an acousto-optic modulator or electro-optic modulator may be employed to modulate the pulse energy of successive pulses. Alternatively, or in combination with the fast response amplitude control mechanism, the pulse repetition frequency may be increased or decreased to effect a change in the pulse energy of successive pulses. FIG. 6 displays the characteristic relationship between pulse energy and pulse repetition frequency (PRF) of a laser 14 employed during practice of the invention. As FIG. 6 indicates, pulse energies of greater than 200 µJ can be obtained from the Model 210-V06. In addition, the characteristic relationship between pulse energy and PRF for alternative lasers, Lightwave Electronics 210-V09L and Lightwave Electronics 210-V09H, are also shown. Those skilled in the art will appreciate that FIG. 6 is illustrative of the principal described and alternate embodiments of laser system 10 will produce different characteristic relationships between pulse energy and pulse repetition frequency.

Figure 10:
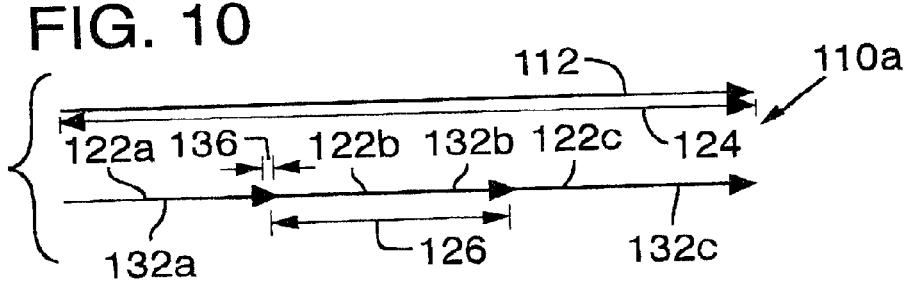
FIG. 10 is a simplified representation of a segmented cutting profile produced in accordance with the present invention.

FIG. 7 depicts a simplified monitoring system 80 that employs one or more sensors 82 optically in communication with the target position 34 on the workpiece 12. In one embodiment, a mirror 84 is positioned along the optical path 20, upstream or downstream of fast positioner 50, and is transmissive to the outgoing beam but reflects any incoming radiation to the sensors 82. Skilled persons will appreciate, however, that mirrors and other optics associated with monitoring system 80 may be aligned completely independently from optical path 20 and a variety of detection techniques can be employed. The sensors 82 of monitoring system 80 may be sensitive to the intensity, albedo, wavelength and/or other properties of light emitted, scattered, or reflected from the target material or support material positioned beneath it. Sensors 82 may, for example, be photodiodes and may include or form part of beam detection devices 54. Typically, sensors 82 detect less feedback when the cut path 112 (FIG. 10) is open. Sensors 82 may, for example, communicate with laser controller 70 and/or beam positioning system 30 to provide the cut-status information continuously or for one or more discrete points along a given segment 122 (FIG. 10). By employing real-time monitoring of the completed and uncompleted portions or areas of the cut path 112, the laser system 10 through a beam positioning system 30 can direct the laser system output 32 only to portions of the cut path 112 that need additional cutting. This monitoring and selective segment processing reduce the amount of time spent along a traditional cut path 112 impinging already-completed portions along the entire path. Thus, cutting throughput is improved.

Figure 8:
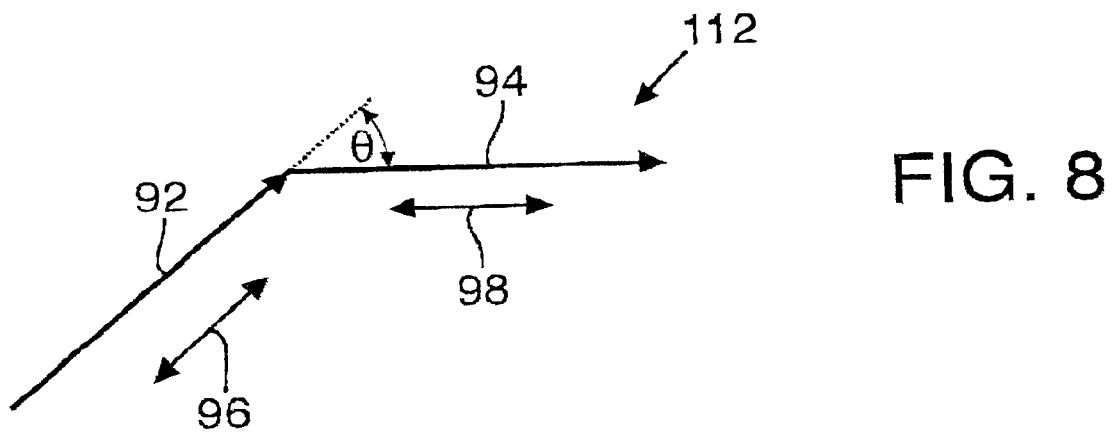
FIG. 8 depicts a cut path having respective first and second transverse directions through which cutting speed is enhanced by an optional polarization tracking system.

FIG. 8 depicts a cut path 112 having respective first and second transverse directions 92 and 94. Laser system 10 optionally employs a polarization tracking system 90 (FIG. 3) that includes a polarization control device, such as a rotatable half wave-plate or a Pockel's cell, to change the polarization direction or orientation of laser system output 32 to track changes in the cutting path direction. The polarization control device may be positioned upstream or downstream of fast positioner. When laser system output 32 is in a trench and moving relative to the target material, the laser system output 32 impinges the target material at a nonnormal angle, resulting in a polarization effect that is not present when impingement is nonmoving and normal to the target material. Applicants have noted that coupling efficiency and therefore throughput are increased when the polarization direction is in a particular orientation with respect to the cutting direction. Therefore, the polarization tracking system 90 may be employed to keep the polarization orientation in an orientation that maximizes throughput. In one embodiment, polarization tracking system 90 is implemented to keep the polarization orientation parallel with the cutting direction or orientation to increase the coupling energy of the laser system output into the target material. In one example, when cutting directions 92 and 94 differ by an angle theta, the half waveplate is rotated by theta/2 to change a first polarization orientation 96 to a second polarization orientation 98 to match the cutting direction change of theta.

The polarization control device may also be implemented as a variable optical retarder, such as a Pockel's cell. A drive circuit conditions a polarization state control signal, which the drive circuit receives from a processor associated with beam positioning system 30 and/or laser controller 70. In this example, there is a one-to-one correspondence between the magnitude of the polarization state control signal and a beam positioning signal such that the polarization direction of the light beam is maintained generally parallel to its cutting path. U.S. Pat. No. 5,057,664 of Johnson et al. describes a method for correlating the direction of beam polarization with trimming direction. Skilled persons will appreciate that the optimized polarization orientation versus cutting direction may vary with laser systems and materials, such that the preferred polarization orientation may be parallel, vertical, orthogonal, elliptical (with the long axis in any given orientation), or any other orientation with respect to the laser pass or cutting direction.

Figure 9:
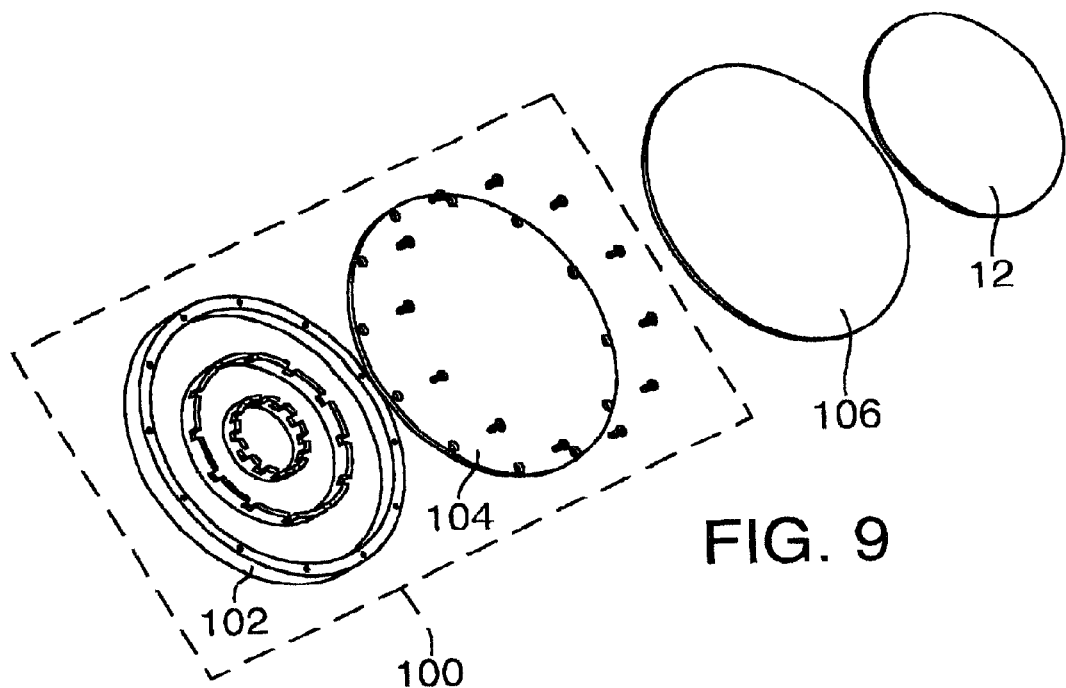
FIG. 9 is a representative illustration of an ultraviolet transparent chuck on which semiconductor workpieces are placed for throughout processing using ultraviolet ablative segmented cutting in accordance with the present invention.

FIG. 9 is a representative illustration of a chuck assembly 100 on which silicon workpieces 12 are preferably placed for throughout processing using an ultraviolet segment cutting method. Chuck assembly 100 preferably includes a vacuum chuck base 102, a chuck top 104, and an optional retaining carrier 106 placed over chuck top 104 for the purpose of supporting a silicon workpiece 12 and retaining it after a throughout application. Base 102 is preferably made from traditional metal material and is preferably bolted to an additional plate 108 (FIG. 3). Plate 108 is adapted to be easily connected to and disengaged from at least one of the stages 36 or 38. The engagement mechanism is preferably mechanical and may include opposing grooves and ridges and may include a locking mechanism. Skilled person will appreciate that numerous exact alignment and lock and key mechanisms are possible. Skilled persons will also appreciate that the base 102 may alternatively be adapted to be secured directly to the stages 36 or 38.

Chuck top 104 and optional retaining carrier 106 may be fabricated from a material that has low reflectivity (is relatively absorbent or relatively transparent) at the ultraviolet wavelength selected for the particular patterning application to minimize backside damage to silicon workpieces 12 around through trenches from reflective energy coming off the metal chuck top after through processing has been completed. In one embodiment, chuck top 104 or retaining carrier 106 may be fabricated from an ultraviolet absorbing material, such as Al or Cu, in order that laser system 10 may use a tool path file of the pattern of shallow cavities to be drilled into the workpiece 12 to cut the corresponding pattern into the material of chuck top 104 and/or retaining carrier 106. The cavities may, for example, correspond to intended throughcuts and prevent backside damage to the workpiece 12 during throughout operations. In addition, any debris from the process may settle into the cavities away from the backside of workpiece 12. In one preferred embodiment, the pattern of the shallow cavities is processed to have dimensions slightly larger than those of the corresponding workpieces 12 after processing, thereby enabling processed workpieces 12 to settle into the cavities of the retaining carrier 106. A retaining carrier 106 with cavities or through holes may be very thick to increase the distance between chuck top 104 and the focal plane. Retaining carrier 106 may also be machined to contain shallow cavities into which the processed silicon workpieces 12 settle after through processing operations. In an alternative embodiment, where 355 nm output is employed, a UV-transparent chuck top 104 may be fabricated from ultraviolet-grade or excimer grade fused silica, $MgF_2$, or $CaF_2$. In another embodiment, UV-transparent chuck top 104 may alternatively or additionally be liquid-cooled to assist in maintaining the temperature stability of the silicon workpieces 12. More details concerning exemplary chuck assemblies 100 can be found in the '497 application of Baird et al.

The above-described performance characteristics of UV laser system 10 can be used for high-speed cutting of semiconductors, and particularly silicon. Such cutting operations may include, but are not limited to, formation or trepanning of large diameter vias through or partially through silicon wafers or other silicon workpieces 12; formation of through or partly through trenches of complex geometry for the purpose of singulation of processed die on silicon wafers or silicon workpieces 12; formation of microtab features to separate microcircuits formed in silicon from parent wafers; formation of features on and/or singulation of AWGs and sliders; and formation of features in MEMS. In addition, the present invention facilitates feature formation without significant melt lip formation, without significant slag formation, and without significant peel back of the feature edge.

Applicants have discovered that laser cut rates for silicon, and other like materials, can be significantly improved by segment scanning or cutting instead of traditional methods of full path cutting. The processing throughput can be enhanced by appropriate selection of segment length, segment overlap, and/or overlap of subsequent passes within each segment, as well as by selection of other processing parameters.

By segment cutting, the consequences of material backfill in the cut trench may be avoided or minimized. FIG. 2B suggests that trench backfill may be a significant limitation to dicing speed. It is proposed that by making quick short open segments or subsegments, the laser system 10 can provide an avenue for much of the laser ejected material to escape rather than refill the trenches as they are being cut. Hence, reduced trench backfill will decrease the number of passes necessary to cut through a given portion of the cut path 112. FIGS. 10–17 present exemplary segmented cutting profiles 110a–110f (generically profiles 110) employed in the present invention. The techniques presented below generally permit a 750 μm-thick silicon wafer to be cut with only about 4 W UV laser power at 10 kHz in about 26 or fewer passes compared to the 150 passes needed using a conventional laser cutting profile.

FIG. 10 depicts a simplified representation of an exemplary segmented cutting profile 110a of the present invention. With reference to FIG. 10, cutting profile 110a is shown, for convenience, having a path cutting direction (indicated by the direction of the arrow) from left to right along cut path 112 and having generally distinct cutting segments 122a, 122b, and 122c (generically, cutting segments 122) formed in a segment cutting direction (or laser pass direction) that is the same as the path cutting direction by respective groups of passes 132a, 132b, and 132c (generically, laser passes 132) of laser system output 32. In this example, the lengths of the laser passes 132 substantially equal the lengths 126 of the segments 122. Skilled persons will appreciate that cutting profile 110a, and subsequent exemplary cutting profiles 110, may preferably include from two to an infinite number of cutting segments 122, depending on total respective lengths 124 of cutting profiles 110.

Figure 11:
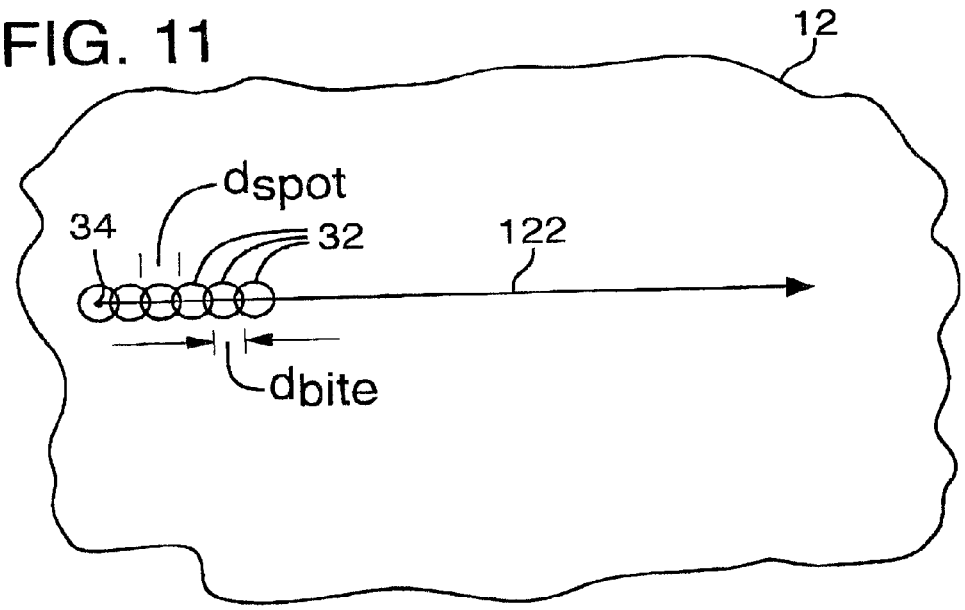
FIG. 11 is a simplified plan view of an enlarged cutting segment sequentially impinged by overlapping laser spots.

FIG. 11 is a simplified plan view of an enlarged cutting segment 122 sequentially impinged by slightly overlapping spots having a spot area of diameter, $d_{spot}$, on workpiece 12. With reference to FIG. 11, although the spot area and $d_{spot}$ generally refer to the area within the outside edge of the laser spot when the laser power falls to $1/e^2$ of the laser peak power, these terms are occasionally used to refer to the spot area or diameter of the hole created by a single pulse or the width of a kerf created in a single pass of pulses. The difference between the $1/e^2$ dimension and the kerf diameter will vary with the laser, the material, and other parameters.

The distance of new target material impinged by each sequential laser pulse is called the bite size $d_{bite}$. A preferred bite size $d_{bite}$ for laser cutting of materials of interest, such as silicon, includes an advantageous bite size range of about 0.5 μm to about $d_{spot}$, and more preferably a range of about 1–50 μm, with a typical range of about 1–5.5 μm, and most typically a bite size of about 1 μm. For some materials, adjusting the bite size results in a condition where the redep debris generated may be easier to remove. The bite size can be adjusted by controlling the speed(s) of the laser beam positioning system 30 and coordinating the movement speed(s) with the repetition rate of the firing of the laser 14.

With reference again to FIGS. 10 and 11, generally a preferred length 126 for cutting segments 122 may be dependent on the characteristics of the material being processed, its thickness, and the response time of the positioning system 30, including its acceleration/deceleration limits, degree of ringing of the mechanical components, and return movement time. For example, if segments are too short, the number of segments for a given cut will be very large, and the amount of time lost to change of direction between passes will be very large. Thus, positioning system characteristics may impact determination of the minimum segment length. Segment length 126 may be a function of bite size, repetition rate, and positioning system performance as well as other possible factors, and each or all of these factors may be optimized based on laser pulse intensity. Skilled persons will appreciate that segments 122a–122c need not have the same lengths 126.

Generally each segment 122 is scanned substantially collinearly with consecutive passes 132 of laser output 32 (skipping over completely processed portions) until it is completely processed, e.g. a throughcut is made along the entire length 126 of the segment 122 or until the target material is trenched to a desired depth before a subsequent segment 122 is processed. If snapstrates are desired, a series of discontinuous throughcuts may be desirable, or no through hole cutting may be desirable and nearly throughcut trenches may be desirable. One to several scans across the entire cut path length can be optionally employed in the process, particularly before and/or after the segment cutting steps, to maximize the throughput and/or improve the cut quality Typically, a through hole can be made in each segment in from 5–10 laser passes such that some of the debris can escape through the through holes. However, if desired, each segment 122 can be processed with multiple passes to an intermediate depth, and the cutting profile can be reapplied, perhaps even in the opposite direction if desirable. If segments are initially processed only to a status where they each have a through hole in one portion, then it may also be advantageous in some circumstances to implement a traditional cutting profile as soon as all the segments 122 include significant through holes. To distinguish from laser punching, skilled persons will appreciate that the segment length 126 is greater than $d_{spot}$. Furthermore, laser punching each spot to create a through hole before moving along the cut path 112 would take longer, possibly damage the target material, and cause other less favorable results.

In an exemplary embodiment, for cutting thick silicon, each segment 122 has a segment length 126 of about 10 μm to 1 mm, typically from about 100 μm to 800 μm, and most preferably from about 200 μm to 800 μm. With respect to cutting profile 110a, segments 122 are preferably slightly overlapped by an overlap distance 136 that may be as small as the bite size or larger than several spot sizes. However, skilled persons will appreciate that the final pass processing segment 122a and the first pass processing segment 122b may be combined into a double length segment 122 (without overlap). Although it is preferred to maintain the same laser parameters during any given pass 132 along a segment 122, skilled persons will appreciate that it is possible to change laser parameters during any given pass 132 to accommodate specific applications.

FIG. 12 depicts a simplified representation of an exemplary segmented cutting profile 110b. With reference to FIG. 12, cutting profile 110b is shown, for convenience, having a path cutting direction from left to right and having distinct cutting segments 122d, 122e, and 122f (generally, cutting segments 122) formed from respective laser passes 132d, 132e, and 132f in a segment cutting direction that is opposite the path cutting direction. Thus, segment 122d is processed from right to left and then segment 122e is processed from right to left, etc.

An advantage of cutting profile 110b over cutting profile 110a is that the debris generated while cutting segment 122d is generally scattered in the direction of segment 122e (backwards with respect to the laser pass direction) where there is no preexisting trench to be backfilled by the debris. Any such debris that does land along the subsequent segment 122 to be cut will be immediately processed. In addition, since the path cutting direction is opposite the segment cutting direction, the debris generated will generally not occlude the trench of the previously cut segment 122. Skilled persons will appreciate that other than the difference between path cutting direction and segment cutting direction, most of the discussion concerning FIGS. 10 and 11 is germane to FIG. 12.

FIG. 13 depicts a simplified representation of an exemplary segmented cutting profile 110c. With reference to FIG.

13, cutting profile 110c is shown, for convenience, having a path cutting direction from left to right and having distinct cutting segments 122g, 122h, and 122i (generally, cutting segments 122) formed from respective laser passes 132g, 132h, and 132i that each proceed from left to right and from right to left in a back and forth overlapping scanning fashion. In particular, segment 122h is first processed from left to right and then from right to left, etc. until it is completely processed, for example, and then segment 122i is similarly processed. Because the segments 122 are being processed in both directions, the nonprocessing movement returns of the positioning system 30 is eliminated, resulting in a higher usage of the system capability. Because a laser pass 132 may take longer than nonprocessing movement returns of the positioning system 30, segments 122 in FIG. 13 may be shorter than those used in FIGS. 10 and 12 in applications where it is desirable to impinge debris or exposed portions of a trench within a prescribed period of time from the previous impingement. Other than some of the details specified above, most of the discussion concerning FIGS. 10–12 is germane to the example in FIG. 13.

FIG. 14 depicts a simplified representation of an exemplary segmented cutting profile 110d. With reference to FIG. 14, cutting profile 110d is shown, for convenience, having a path cutting direction from left to right along cut path 112 and having distinct cutting segments 122j, 122k, and 122m (generally, cutting segments 122) formed from right to left. FIG. 14 also depicts multiple, substantially collinear laser pass sets $140_1$, $140_2$, and $140_3$ (generically laser pass sets 140), each comprising an initial pass $132_k$ and multiple gradually lengthening overlapping and substantially collinear passes $132_m$-$132_r$, preferably processed in alphabetical order. Although cutting passes $132k_1$-$132r_3$ are depicted as parallel in FIG. 14 for convenience, cutting passes $132k_1$-$132r_3$ are preferably substantially collinear and collinear with the respective segments 122.

Unlike the slight optional overlaps between adjacent segments 122 associated with the examples in FIGS. 10, 12, and 13, the overlap lengths associated with adjacent segments 122 or passes 132 in this and the following examples are typically greater than about 10%, more typically greater than about 25%, and most typically greater than about 50%, and occasionally exceeding 67% or 85%. In one particular example where a 300 μm segment is employed, an overlap length of 200 μm is employed; and in another example where a 500 μm segment length is employed, a 250 μm overlap length is employed.

One reason to employ laser passes 132 that have different end points within a segment 122 is to prevent a "scan end" effect where more material is stacked at the end of segment 122 whenever it is processed by identical overlapping passes 132. Thus, an advantage of lengthening of consecutive passes 132 or consecutive small groups of passes is to spread the scan effect over longer cut lengths so that the cutting speed across an entire segment 122 or the entire cut path 112 becomes more uniform, thereby enhancing throughput and cut quality. The scan effect on quality can also be mitigated by employing full cutting path length scans or passes 132 after the segment cutting process is finished.

Preferably, each pass 132 is employed only once and each laser set 140 is employed only once to process the respective segment 122 to a desired intermediate depth or to a complete through cut before the next segment 122 is processed. Alternatively, laser set $140_1$ of cutting passes $132k_1$-$132r_1$ can be repeated until a throughcut is made along some or all of segment 122j, then subsequent laser sets 140 can be repeated segment by segment until the entire cut path 112 is throughcut. Although only five overlapping passes 132 are shown for each laser pass set 140, skilled persons will appreciate that a substantially greater number of overlapping passes 132 could be employed, particularly with smaller incremental length increases as needed to accommodate the thickness of the target material. Skilled persons will also appreciate that any or all of the passes 132 employed in cutting profile 110d could be processed in both directions instead of a single direction as shown in FIG. 14. Skilled persons will also appreciate that multiple applications of each laser pass set 140 could be employed, that multiple applications of one or more passes 132 in a laser pass set 140 could be employed, that the numbers of each distinct pass 132 within a pass set 140 may differ, and that the number of applications of laser pass sets 140 and laser passes 132 may differ during the processing of a single cut path 112. Any of these variables may be adjusted in real time in response to monitoring information. Other than the details specified above, much of the discussion concerning FIGS. 10–13 is germane to the example in FIG. 14.

Figure 15:
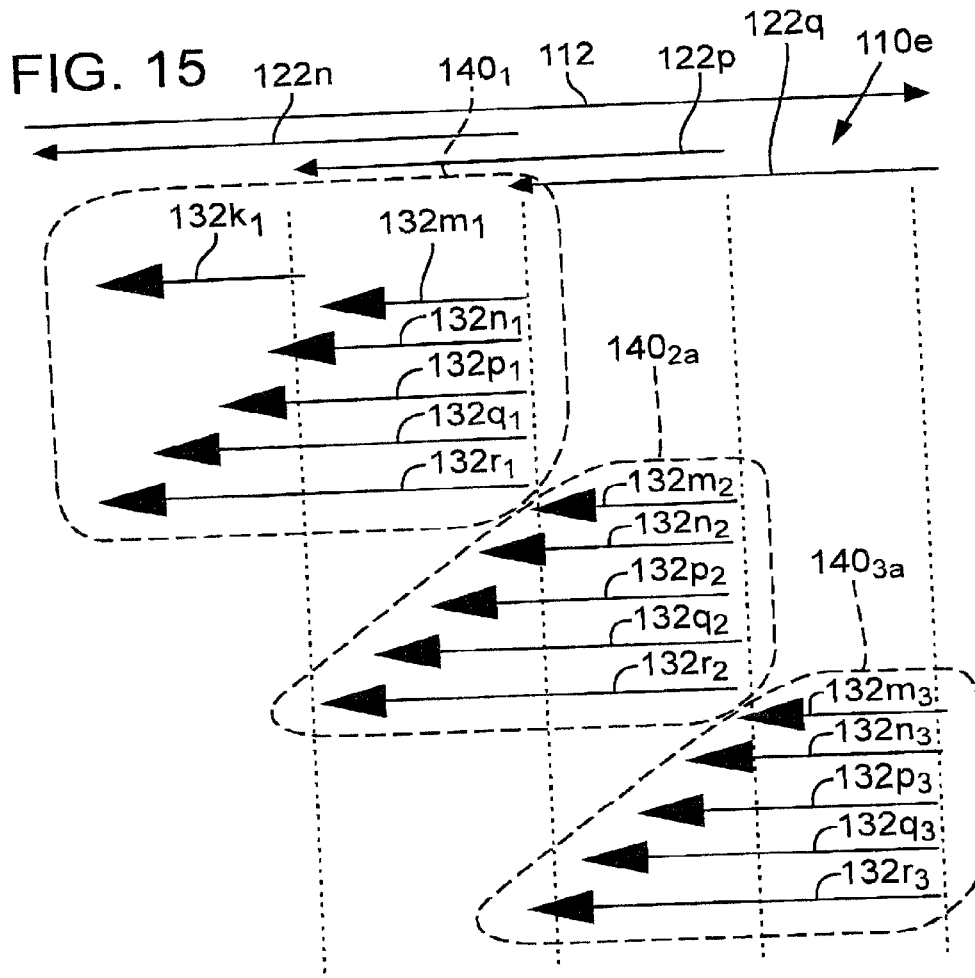
FIG. 15 is a simplified representation of an alternative segmented cutting profile produced in accordance with the present invention.

FIG. 15 depicts a simplified representation of an exemplary segmented cutting profile 110e that is somewhat similar to profile 110d, the cutting segments 122n, 122p, and 122q overlap to a greater degree and the subsequent laser pass sets $140_{2a}$ and $140_{2b}$ omit laser passes 132k. With reference to FIG. 15, profile 110e begins with the same laser pass set $140_1$ that begins profile 110d. However, laser pass sets $140_{2a}$ and $140_{2b}$ omit laser passes 132k and their laser passes 132 increasingly overlap (about 86% in the following example) the previously laser pass set 140. In one example of this embodiment, laser pass $132k_1$, which has a length of 200 μm, is applied 30 times. Then, laser pass $132m_1$, which has a length of 240 μm (200 μm plus ⅕ of the length of pass $132k_1$), is applied 6 times (⅕ of 30 passes). Then, laser pass $132n_1$, which has a length of 280 μm (200 μm plus ⅖ of the length of pass $132k_1$), is applied 6 times. This sequence is continued until laser pass set $140_1$ is completed and then performed in connection with laser pass sets $140_{2a}$ and $140_{2b}$ with laser passes 132k omitted. In this example, the later portions of each segment 122 may not be throughcut until some of the subsequence segment 122 is processed. An advantage of overlapping the segments 122 to include portions of cut path 112 that are already throughcut is that any debris created by the shorter laser passes 132 that is deposited on the sides of throughcut portions is removed by the subsequent longer laser passes 132. The pass sets 140 in this example can exhibit dicing speeds of greater than or equal to 8.5 mm/minute with a 3.5 W UV laser, operated at 10 kHz, on a 750 μm-thick silicon wafer.

Figure 16:
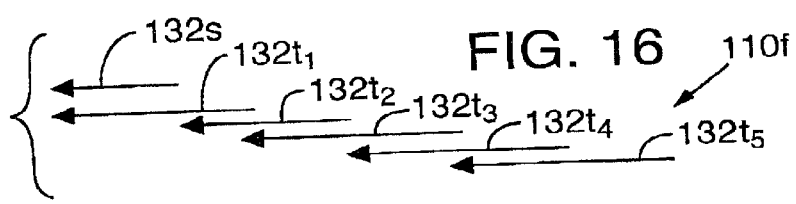
FIG. 16 is a simplified representation of an alternative segmented cutting profile produced in accordance with the present invention.

FIG. 16 depicts a simplified representation of an exemplary segmented cutting profile 110f With reference to FIG. 16, cutting profile 110f is shown, for convenience, having a path cutting direction from left to right and having distinct laser passes $132s_1$-$132t_5$ formed from right to left. Although laser passes $132s_1$-$132t_5$ are depicted as parallel in FIG. 16 for convenience, they are preferably substantially collinear. FIG. 16 depicts an initial laser pass 132s and multiple gradually lengthening overlapping passes $132s_1$-$132t_5$, preferably processed in numerical subscript order. In an exemplary embodiment, the length of laser pass 132s is about 200 μm or 300 μm and the length of each subsequent laser pass 132t is about 500 μm. This exemplary profile can yield dicing speeds of greater than or equal to 10.4 mm/minute with a 3.5 W UV laser, operated at 10 kHz, on a 750 μm-thick silicon wafer. For shallow trenches, each pass 132 may be applied only once, and for throughcuts in thick target materials, each pass 132 may be applied multiple times before the next sequential pass 132 is undertaken. Preferably, each laser pass 132 is applied multiple times to reach a selected intermediate depth before the next laser pass 132 is processed. In one embodiment, each consecutive laser pass 132 receives a single pass of laser output 32 and then the entire profile 110*f* is repeated or the laser passes 132 are processed in reverse order.

Although only five overlapping laser passes 132*t* are shown, skilled persons will appreciate that a substantially greater number of overlapping laser passes 132 could be employed, particularly with smaller incremental length increases as needed to accommodate the thickness of the target material. Skilled persons will also appreciate that any or all of the laser passes 132 employed in cutting profile 110*f* could be sequentially processed in both directions instead of a single direction as shown in FIG. 16. Other than the details specified above, much of the discussion concerning FIGS. 10–15 is germane to the example in FIG. 16.

Figure 17:
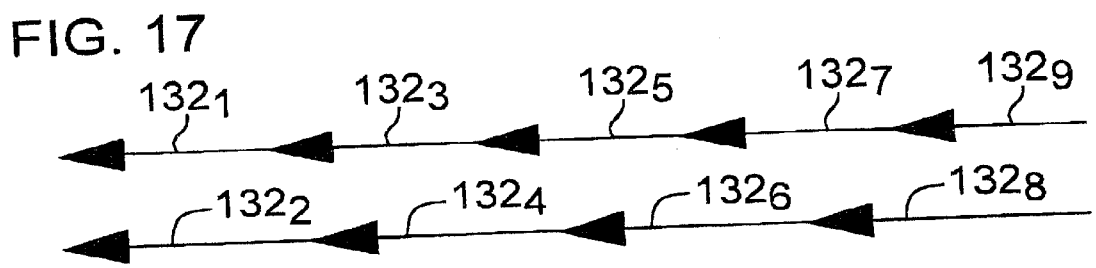
FIG. 17 is a simplified representation of an alternative segmented cutting profile produced in accordance with the present invention.

FIG. 17 depicts a simplified representation of an exemplary segmented cutting profile 110*g* that is somewhat similar to profile 110*f*. With reference to FIG. 17, odd subscripted laser passes $132_1$, $132_3$, $132_5$, $132_7$, and $132_9$, have an exemplary pass length of 200 μm and even subscripted laser passes $132_2$, $132_4$, $132_6$, and $132_8$ have an exemplary pass length of 270 μm. A group of one of these laser passes 132 is delivered before the next sequential group is delivered. In one example the odd subscripted laser passes 132 are applied more times or to a greater relative depth (60% of cut depth versus 40% of cut depth, for example) than the even subscripted passes. This cutting profile with the exemplary pass lengths avoids an overlap junction until 5.4 mm along the cut path 112. Skilled persons will appreciate that a variety of cutting profiles and pass lengths can be employed to reduce scan effects and backfill and thereby facilitate enhanced throughput.

FIG. 18 is a representative illustration of ultraviolet ablative patterning of a trench or throughout 150 in a workpiece 12 such as a wafer having an intrinsic silicon substrate 148 of a height or thickness 152 of 750 μm overlaid with a 0.5 μm-thick passivation layer of $SiO_2$ (not shown). Those skilled in the art will recognize that the thickness of the silicon workpieces and the thickness of the passivation layers will vary.

The trench 150 is preferably patterned by positioning the silicon workpiece 12 at the focal plane of the laser system 10 and directing a string of successively overlapping laser system output pulses 32 at the silicon workpiece 12 as the laser positioning system 30 moves workpiece 12 along the X- and/or Y-axes of the workpiece 12. The Z-height of the laser focus position can be simultaneously moved coincident with each succeeding laser pass 132 to place the laser focus at a sequentially deeper position in the silicon workpiece 12, thereby maintaining the focused spot at a position more coincident with the remaining silicon surface.

For forming a trench or throughout 150 in silicon, an exemplary energy per pulse range is about 100 μJ to 1500 μJ, with a typical a energy per pulse range of about 200 μJ to 1000 μJ and a more typical energy per pulse range of about 400 μJ to 800 μJ, and most preferably an energy per pulse over about 800 μJ is employed. An exemplary PRF range is about 5 kHz to 100 kHz, with a typical PRF range from about 7 kHz to 50 kHz and a more typical PRF range from about 10 kHz to 30 kHz. Those skilled in the art will recognize that the laser performance as shown in FIG. 6 can achieve energy per pulse output at PRFs within the typical ranges described above. An exemplary focused spot size range is about 1 μm to 25 μm, with a typical focused spot size range from about 3 μm to 20 μm and a more typical focused spot size range from about 8 μm to 15 μm. An exemplary bite size range is about 0.1 μm to 10 μm, with a typical a bite size range from about 0.3 μm to 5 μm and a more typical bite size range from about 0.5 μm to 3 μm. The bite size can be adjusted by controlling the speed of either or both of the stages of the laser beam positioning system 30 and coordinating the movement speed(s) with the repetition rate and firing of the laser. An exemplary segment size is about 200 μm to 800 μm. An exemplary combination employing a V06 laser on a 2700 micromachining system used a segment length of 300 μm and a segment overlap of 200 μm provided a very fast dicing speed. Skilled persons will appreciate that for different applications with different lasers for processing different materials, the preferred laser, segment, pass, and other parameters can be extremely different.

In one example, a trench or throughout 150 can be made through 750 μm-thick intrinsic silicon overlaid with a 2.0 μm passivation layer of $SiO_2$ using an output pulse energy from the laser 14 of about 360 μJ and using a bite size of 1 μm with a stage velocity of 10 mm/s in fewer than 25 passes over the length of a cut path 112 over an 8"-diameter workpiece 12 with laser pulses having a focused spot size ($1/e^2$) diameter of 12 μm at the work surface. A trench 150 produced employing parameters described above may, for example, have a top surface opening width (diameter) ($d_t$) 154 of about 20 μm and an exit width (diameter) ($d_b$) 156 of about 13 μm, thereby producing an aspect ratio for this trench of about 30:1 and an opening taper angle of 0.4°. In some applications, it may be desirable to create an initial though hole before scanning a segment.

Persons skilled in the art will further appreciate that the selected segmented profile and segment length and the values of energy per pulse, focused spot size, and number of pulses employed to efficiently produce high quality trenches or throughcuts 150 in silicon may vary according to the material and thickness 152 of the silicon workpiece 12, relative thickness and composition of overlayers, of which $Sio_2$ is only one example, and the wavelength employed. For example, for production of throughcuts 150 in silicon only 50 μm thick, fewer than ten passes may be employed to produce the desired throughout.

Those skilled in the art will recognize that various patterns of varying geometry, including, but not limited to, squares, rectangles, ellipses, spirals, and/or combinations thereof, may be produced through programming of a tool path file used by laser system 10 and positioning system 30 to position silicon workpiece 12 along X and Y-axes during processing. For laser cutting, the beam positioning system 30 is preferably aligned to conventional typical saw cutting or other fiducials or a pattern on the wafer surface. If the wafers are already mechanically notched, alignment to the cut edges is preferred to overcome the saw tolerance and alignment errors. The various segmented cutting profiles may be preprogrammed into the tool path file or other positioning system command files.

Laser system 10 can be employed to produce one or more groups of small through holes, such as by laser punching using the laser parameters set forth above. These through holes can be positioned on the top side near the periphery of workpieces 12, circuits or dies, or within scribing, slicing, or dicing streets or their intersections such that the back or bottom side of workpiece 12 can be precisely aligned to with respect to features on the top side. Such alignment facilitates backside processing such as laser scribing or sawing to enhance processing speed or quality. Techniques for front and/or backside wafer slicing or dicing are discussed in more detail in U.S. patent application Ser. No. 09/803,382 ('382 application) of Fahey et al., entitled "UV Laser Cutting or Shape Modification of Brittle, High Melting Temperature Target Materials such as Ceramics or Glasses," which is incorporated herein by reference. This information was published on Mar. 21, 2002 under U.S. Patent Publication No. US-2001-0033558 and published on Mar. 28, 2002 under International Patent Publication No. WO 02/24396, which correspond to the '382 application.

Laser cutting destroys significantly less material (kerfs of less than 50 μm wide and preferably less than 25 μm wide and typically about 10 μm wide) than does mechanical cutting (slicing lanes of about 300 μm wide and dicing paths of about 150 μm wide) so that devices on wafers can be manufactured much closer together, allowing many more devices to be produced on each wafer. Thus, the laser cutting process minimizes the pitch between rows and the pitch between devices.

Elimination of the mechanical cutting can also simplify manufacture of devices on workpieces 12. In particular, mechanical cutting can impart significant mechanical stress to devices such that they come off their carriers. To avoid losing rows, device manufacturers may employ strong adhesives or epoxies between the rows and the carrier. An all laser process significantly reduces the mechanical strength requirements of the adhesive used for fixturing the rows onto a carrier. Laser cutting, therefore, permits the elimination of strong adhesives or epoxies used to affix the rows to the carrier and the harsh chemicals needed to remove them. Instead, the adhesives can be selected for ease of debonding, such as the reduction of debond time and less exposure to potentially corrosive chemicals, and for amenability to UV laser processing, greatly reducing risk of damage to the devices, and thereby enhancing yield.

Laser row slicing reduces row bow because laser slicing does not exert as much mechanical stress as mechanical slicing. However, if row bow or other of the row defects are apparent, the rows can be laser diced (and re-sliced) to compensate for these defects without concern for the critical device to device alignment needed between rows for mechanical dicing. For convenience, the term (through) cutting may be used generically to include slicing (often associated with wafer row separation) or dicing (often associated with part singulation from wafer rows), and slicing and dicing may be used interchangeably in the context of this invention.

Because positioning system 30 can align to through holes or fiducials, laser system 10 can process each row and/or each device independently. With respect to slanted rows, the laser spot can perform traverse cuts across the slanted rows at appropriate positions with respect to outer edges of the devices with stage and/or beam translations between each cut to effect a rectangular or curvilinear wave patterns as desired. Thus, laser dicing can compensate for row fixturing defects and perhaps save entire rows of devices that would be ruined by mechanical dicing.

Another application of the segment cutting method is to produce MEMS (microelectronic machine system) devices 160. FIG. 19 is a representative illustration of ultraviolet laser cutting of a MEMS device 160. In one preferred embodiment, the MEMS device 160 is cut using the method described above to create trenches 162a, 162b, 162c, 162d, and 162e (generically trenches 162) in silicon and to create a depression 164 by employing a pattern of adjacent trenches 162. Skilled persons will appreciate that through computer control of the X and/or Y axes of the laser positioning system 30, the directed laser system output pulses 32 can be directed to the work surface such that overlapped pulses create a pattern which expresses any complex curvilinear geometry. Skilled persons will appreciate that the segmented cutting techniques and other processing techniques disclosed herein can be used to cut arcs and other curves for nonMEMS applications as well.

Another application of the segmented cutting method is to process optical integrated circuits, such as an arrayed waveguide gratings (AWG) device 170 produced on semiconductor wafer workpieces 12. FIG. 20 is a representative illustration of ultraviolet ablative patterning of an AWG device 170. In one preferred embodiment, the AWG device 170 is patterned using the method described above to create curvilinear trenches 172, with portions 172a, 172b, 172c, 172d, and 172e in silicon, for example. Although trench 172 is shown to be symmetric, skilled persons will appreciate that through computer control of the X and/or Y axes of the beam positioning system 30, the laser system output pulses 32 can be directed to the work surface such that overlapped pulses 32 create a pattern which expresses any complex curvilinear profile or geometry. Skilled persons will appreciate that segments 122 are not required to be linear and can be arcs such that each portion 172 can be processed with one or more nonlinear segments 122. This capability may be used to produce complex curvilinear geometric patterns in silicon useful for efficient production of a variety of AWG devices 170. Skilled persons will also appreciate that the segmented cutting techniques could be employed to produce large diameter through hole or blind vias.

The '382 application of Fahey et al. describes techniques for forming rounded edges along cuts, as well as for laser slicing and dicing ceramic wafers. Many of these techniques, as well as the alignment techniques disclosed therein, can be advantageously incorporated into the present invention to cut silicon wafers and further improve the quality of and processing speed for cutting ceramic or other brittle, high melting temperature materials, such as glasses. U.S. patent application Ser. No. 09/803,382 is herein incorporated by reference.

It is contemplated that performing the cuts in a reactive gas atmosphere, such as an oxygen-rich atmosphere, will generate debris that is easier to cut. In an oxygen rich environment, for example, it is proposed that the hot ejected silicon will more likely form $SiO_2$ in an exothermic reaction that may keep any resulting $SiO_2$ backfill redep at a higher temperature for a longer time making it less likely to stick strongly on the silicon and/or making it easier to clean from a trench with a quick subsequent laser pass 132. To the extent that redep (or exposed trench material) cooling or resolidification is a factor, this recharacterization time interval may to some extent influence the maximum preferred length 126 of segments 122 such that the laser spot can process length 126 and return to impinge again any redep (or warmed exposed trench material) at the initial laser pass 132a and subsequent laser passes 132 before the redep (or exposed trench material) cools or sticks strongly.

Skilled persons will also appreciate that purge gases, such as nitrogen, argon, helium, and dry air, may be usefully employed to assist in the removal of waste fumes from the workpiece 12 and more preferably to blow potential backfill through any existing throughcut portions along cut path 112. Such purge gases can be delivered to the close vicinity of the work surface using delivery nozzles attached to laser system 10.

If desirable, silicon workpieces 12 processed in accordance with the present invention may be cleaned using ultrasonic baths in liquids including but not limited to water, acetone, methanol, and ethanol to improve the surface quality of affected areas. Those skilled in the art will also recognize that cleaning of processed silicon workpieces 12 in hydrofluoric acid can be beneficial in removing unwanted oxide layers.

Although the present invention is presented herein only by way of example to silicon wafer cutting, skilled persons will appreciate that the segmented cutting techniques described herein may be employed for cutting a variety of target materials including, but not limited to, other semiconductors, GaAs, SiC, SiN, indium phosphide, glasses, ceramics, AlTiC, and metals with the same or different types of lasers including, but not limited to, solid-state lasers, such as YAG or YLF, and $CO_2$ lasers, of similar or different UV, visible, or IR wavelengths.

U.S. Prov. Pat. Appl. No. 60/301,701, filed Jun. 28, 2001, entitled Multi-Step Laser Processing for the Cutting or Drilling of Wafers with Surface Device Layers of Fahey et al., which is herein incorporated by reference describes multi-step techniques for cutting wafers and the device layers they support with different severing processes, such as different laser parameters. This multi-step process involves the optimization of laser processes for each individual layer, such that the processing of any one layer or the substrate material does not negatively affect the other layers. A preferred process entails the use of UV lasers for cutting layers that are transparent in the IR or visible range, allowing for a different laser to be used for cutting the wafer than is used for cutting the layers. This process permits significantly less damage to the layer than would occur if only one laser, such as an IR laser, were used to cut through the entire layer and wafer structure. Furthermore, this laser processing of the layers allows for the optimization of other cutting processes, such as the use of a wafer saw, in order to reduce or eliminate the damage to the layers on the wafer. One example employs a UV laser 10 to cut layers that include ceramic, glass, polymer or metal films on the top or bottom surfaces of the wafer substrate, while a different laser, such as a 532 nm laser or IR laser, or the same laser or optical system run with different process parameters is used to cut through the substrate material after the surface layers have been cleared away. Each of the laser processes may employ the same or different segmented cutting techniques that cooperate with the other laser parameters chosen to facilitate high quality and throughput. Alternatively, surface layers may be processed by conventional full scan processing while the thicker substrate layer may be processed by a segmented technique.

One embodiment entails covering the surfaces of the wafer with a sacrificial layer such as photoresist; optionally removing a portion of the sacrificial layer to create uncovered zones over intended cutting areas; laser cutting the layers atop the wafer substrate to a width equal or greater than that which will occur in the subsequent substrate cutting step; then cutting the wafer with a separate processing step or steps using a different laser, wavelength, pulse width, fluence, bite size, and/or other laser processing parameters.

Another embodiment allows for removal of the surface layer or layers with one laser process or several laser processes and then employs a subsequent process or several subsequent processes that complete the cutting with a non-laser technique that only has to remove the wafer substrate material. One example of such technique is the removal of all metal, polymer or other soft material from the cutting lane using the laser, such that during subsequent cutting with a saw blade, the blade only makes contact with the substrate material. This technique will be of particular use when cutting wafers with metallization in the dice lanes, such as that due to the presence of test devices, or wafers which have a polymer dielectric material such as some of the low-K materials that are presently on the market.

It will be obvious to those having skill in the art that many changes may be made to the details of the above-described embodiment of this invention without departing from the underlying principles thereof. The scope of the present invention should, therefore, be determined only by the following claims.

What is claimed is:

1. A method of increasing throughput in a laser cutting process, comprising:

directing a first pass of first laser pulses to impinge along a first segment of a cutting path having a cutting path length greater than 100 μm, each first laser pulse having a first spot area on a workpiece, the first segment having a first segment length that is longer than the first spot area and shorter than the cutting path length;

directing a second pass of second laser pulses to impinge along a second segment of the cutting path, each second laser pulse having a second spot area on the workpiece, the second segment having a second segment length that is longer than the second spot area and shorter than the cutting path length, the second segment overlapping the first segment by an overlap length greater than at least the first or second spot areas; and after directing at least the first and second passes of laser pulses, directing a third pass of third laser pulses to impinge along a third segment of the cutting path, each third laser pulse having a third spot area on the workpiece, the third segment having a third segment length that is longer than the third spot area and shorter than the cutting path length, the third segment including a subsequent portion of the cutting path other than the first or second segments, wherein the subsequent portion of the cutting path has a nonoverlap length greater than the first, second, or third spot areas.

2. The method of claim 1 in which major portions of the first and second segments overlap.

3. The method of claim 1 in which the second segment includes the first segment.

4. The method of claim 3 in which the first and second segments are processed in a same direction.

5. The method of claim 3 in which the first and second segments are processed in opposite directions.

6. The method of claim 1 in which the first and second segments are processed in a same direction.

7. The method of claim 1 in which the first and second segments are processed in opposite directions.

8. The method of claim 1 in which additional sets of first and/or second laser pulses are applied to the first and/or second segments to form a through trench within the first and/or second segments prior to applying the third laser pulses.

9. The method of claim 1 further comprising:
forming a through trench in the first and/or second segments prior to applying the third laser pulses.

10. The method of claim 1 further comprising:
forming a through trench in the first and/or second segments with multiple passes of laser pulses prior to applying the third laser pulses; and
forming a through trench within the third segment.

11. The method of claim 10 further comprising:
forming a through trench along the entire cutting path length.

12. The method of claim 11 in which the cutting path length is greater than 1 mm and the first, second, and third segment lengths are between about 10 μm and about 500 μm.

13. The method of claim 1 in which the cutting path length is greater than 1 mm and the first, second, and third segment lengths are between about 10 μm and about 500 μm.

14. The method of claim 13 in which the cutting path length is greater than 10 mm and the first, second, and third segment lengths are between about 200 μm and about 500 μm.

15. The method of claim 13 in which the first, second, and third laser pulses are characterized by a UV wavelength, a pulse repetition frequency of greater than 5 kHz, pulse energies of greater than 200 μJ, and a bite size of about 0.5 to about 50 μm.

16. The method of claim 1 in which the first, second, and third laser pulses are characterized by a UV wavelength, a pulse repetition frequency of greater than 5 kHz, pulse energies of greater than 200 J, and a bite size of about 0.5 to about 50 μm.

17. The method of claim 16 in which the workpiece has a thickness greater than 50 μm.

18. The method of claim 17 in which the workpiece has a thickness greater than 500 μm.

19. The method of claim 12 in which the workpiece has a thickness greater than 50 μm.

20. The method of claim 12 in which the workpiece has a thickness greater than 500 μm, the cutting path length is greater than 100 mm, and the throughcut along the entire length of the cutting path is made with fewer than 25 passes of laser pulses over any position along the cutting path.

21. The method of claim 13 in which the workpiece has a thickness greater than 200 μm, further comprising:
   cutting through the entire thickness along the cutting path at a cutting speed of greater than 10 mm per minute.

22. The method of claim 21 in which a major portion of the thickness of the workpiece comprises a semiconductor material, a glass material, a ceramic material, or a metallic material.

23. The method of claim 21 in which a major portion of the thickness of tile workpiece comprises Si, GaAs, SiC, SiN, indium phosphide, or AlTiC.

24. The method of claim 22 in which the laser pulses are generated from a solid-state laser or a $CO_2$ laser.

25. The method of claim 1 in which the laser pulses are generated from a solid-state laser or a $CO_2$ laser.

26. The method of claim 2 in which the overlap length of the first and second portions or the first or second segment lengths are sufficiently short such that the second laser pulses impinge along the overlap length before a major portion of any debris generated by the first laser pulses cools along the overlap length to ambient temperature.

27. The method of claim 1 in which the third segment excludes the first or second segments.

28. The method of claim 1 in which the first laser pulses impinge along the cutting path in a first cutting direction and the first laser pulses have a first polarization orientation that is parallel to the first cutting direction, in which the third laser pulses impinge along the cutting path in a third cuffing direction and the third laser pulses have a third polarization orientation that is parallel to the third cutting direction, and in which the first and third cutting directions are transverse.

29. The method of claim 28 further comprising:
   employing a polarization control device to change from the first polarization orientation to the third polarization orientation.

30. The method of claim 10 further comprising:
   monitoring throughcut status with a throughcut monitor to determine throughcut positions where throughcuts have been affected along the cutting path; and
   reducing impingement of the throughcut positions during the passes of first, second, third, or subsequent laser pulses in response to information provided by the throughcut monitor.

31. The method of claim 1 in which the laser pulses within the first pass have generally similar parameters.

32. The method of claim 1 in which the laser pulses of the first, second, and third passes have generally similar parameters.

33. The method of claim 1 in which the laser pulses of at least two of the first, second, and third passes have at least one generally different parameter.

34. The method of claim 1 in which at least two of the laser pulses in at least one of the first, second, or third passes have at least one generally different parameter.

35. The method of claim 1 in which multiple passes of laser pulses are applied to the first segment to form a throughcut within the first segment.

36. The method of claim 35 in which the throughcut is formed in the first segment before the pass of second laser pulses is applied to the second segment.

37. The method of claim 36 in which multiple passes of laser pulses are applied to the second segment to form a throughcut within the second segment.

38. The method of claim 37 in which the throughcut is formed in the second segment before the pass of third laser pulses is applied to the third segment.

39. The method of claim 38 in which multiple passes of laser pulses are applied to subsequent segments to sequentially form throughcuts within the respective subsequent segments to form a full length throughcut along the cutting path length.

40. The method of claim 1 in which only minor portions of the first and second segments overlap.

41. The method of claim 1 in which the first laser pulses impinge along the cutting path in a first cutting direction and the first laser pulses have a first polarization orientation that is oriented to the first cutting direction to enhance throughput or cut quality, in which the third laser pulses impinge along the cutting path in a third cutting direction and the third laser pulses have a third polarization orientation that is oriented to the third cutting direction to enhance throughput or cut quality, and in which the first and third cutting directions are transverse and the first and third polarization orientations are transverse.

42. The method of claim 1 in which at least one of the segments is an arc.

43. The method of claim 1 in which a purge gas is employed to facilitate blowing potential backfill debris through throughcuts along the cutting path.

44. The method of claim 1 in which an elongated laser pass that includes at least three first, second, and third segments is applied to the cutting path.

45. The method of claim 1 in which each spot area along a segment is in proximity to or partly overlaps the spot area of a preceding laser pulse.

46. A method of increasing throughput for forming a cut along a cutting path having a cutting path length on a workpiece, comprising:
   selecting a segment length that is shorter than the cutting path length;
   directing a first pass of first laser pulses having first spot areas to impinge the workpiece along a first segment of about the segment length along the cutting path;

directing a second pass of second laser pulses having second spot areas to impinge the workpiece along a second segment of about the segment length along the cutting path, the second segment overlapping the first segment by an overlap length greater than at least the first or second spot areas; and after directing at least the first and second passes of laser pulses, directing a third pass of third laser pulses having third spot areas to impinge along a third segment of about the segment length along the cutting path, the third segment including a portion of the cutting path that extends beyond the first or second segments, wherein the portion of the cutting path has a portion length greater than the first, second, or third spot areas.

47. The method of claim 46 in which impingement of laser pulses along the cutting path generates debris and in which the overlap length or the segment length is sufficiently short such that the second pass of second laser pulses impinge along the overlap length before a major portion of any debris generated by the first laser pulses cools to ambient temperature along the overlap length.

48. A method of increasing throughput in a laser cutting process, comprising:

directing a first pass of first laser pulses to impinge along a first segment of a cutting path having a cutting path length, each first laser pulse having a first spot area on a workpiece, the first segment having a first segment length that is longer than the first spot area and shorter than the cutting path length;

directing second passes of second laser pulses to impinge along a second segment of the cutting path, the second segment including an overlap length that overlaps at least a portion of the first segment until a throughcut is made within the overlap length, each second laser pulse having a second spot area on a workpiece, the second segment having a second segment length that is longer than the second spot area and shorter than the cutting path length, the overlap length being greater than at least the first or second spot areas; and after directing at least the first and second passes of laser pulses, directing third passes of third laser pulses to impinge along a third segment of the cutting path until a throughcut is made within the third segment, each third laser pulse having a third spot area on a workpiece, the third segment having a third segment length that is longer than the Third spot area and shorter than the cuffing path length, the third segment including a portion of the cutting path that extends beyond the first or second segments, wherein the portion of the cutting path has a portion length greater than the first, second, or third spot areas.

49. The method of claim 1 in which the overlap length of the first and second portions or the first or second segment lengths are in a range appropriate so as to exploit with second laser pulses persistence of a selected transient effect arising from the interaction of first pulses with the workpiece along the overlap length.

50. The method of claim 46 in which the overlap length of the first and second portions or the first or second segment lengths are in a range appropriate so as to exploit with second laser pulses persistence of a selected transient effect arising from the interaction of first pulses with the workpiece along the overlap length.

51. The method of claim 48 in which the overlap length of the first and second portions or the first or second segment lengths are in a range appropriate so as to exploit with second laser pulses persistence of a selected transient effect arising from the interaction of first pulses with the workpiece along the overlap length.

* * * * *

UNITED STATES PATENT AND TRADEMARK OFFICE
CERTIFICATE OF CORRECTION

PATENT NO. : 6,676,878 B2
DATED : January 13, 2004
INVENTOR(S) : James N. O'Brien, Lian-Cheng Zou and Yunlong Sun It is certified that error appears in the above-identified patent and that said Letters Patent is hereby corrected as shown below:

Column 2,
Line 27, change "V" to -- UV --.
Lines 41-44, replace entire paragraph with paragraph 13 from original application:
"U.S. Patent Application No. 10/017,497 ('497 Application) of Baird et al., further describes using ultraviolet laser ablation to directly and rapidly form patterns with feature sizes of less than 50 $\mu$m in hard to cut materials, such as silicon. These patterns include: formation of very high-aspect cylindrical openings or blind vias for integrated circuit connections; singulation of processed dies contained on silicon wafers; and microtab cutting to separate microcircuits formed in silicon from parent wafer."

Column 3,
Line 54, change "throughout" to -- throughcut --.

Column 4,
Line 37, change "355 m" to -- 355 nm --.
Line 59, delete "and" before "Q-switch".

Column 6,
Line 51, delete period after "output".

Column 9,
Lines 49 and 54, change "throughout" to -- throughcut --.
Lines 60-61, change "Skilled person" to -- Skilled persons --.

Column 10,
Line 13, change "throughout" to -- throughcut --.

Column 12,
Line 12, add a period after "quality".

Column 13,
Line 30, change "$132_k$" to -- 132k --.
Line 32, change "$132_m$-$132_r$" to -- 132m-132r --.

Column 14,
Line 41, change "subsequence" to -- subsequent --.
Line 51, add a period after "110f".

UNITED STATES PATENT AND TRADEMARK OFFICE
CERTIFICATE OF CORRECTION

PATENT NO. : 6,676,878 B2
DATED : January 13, 2004
INVENTOR(S) : James N. O'Brien, Lian-Cheng Zou and Yunlong Sun It is certified that error appears in the above-identified patent and that said Letters Patent is hereby corrected as shown below:

Column 15,
Lines 37 and 55, change "throughout" to -- throughcut --.
Line 57, change "a typical a energy" to -- a typical energy --.

Column 16,
Lines 4-5, change "a typical a bite size" to -- a typical bite size --.
Lines 19 and 44, change "throughout" to -- throughcut --.

Column 17,
Line 6, after "Glasses," insert --  " --.

Column 20,
Line 13, change "cuffing" to -- cutting --.

Column 21,
Line 19, change "J" to -- $\mu$J --.
Line 41, change "tile workpiece" to -- the workpiece --.
Line 59, change "cuffing" to -- cutting --.

Column 24,
Line 11, change "Third" to -- third --.
Line 12, change "cuffing" to -- cutting --.

Signed and Sealed this

Seventeenth Day of May, 2005

JON W. DUDAS
*Director of the United States Patent and Trademark Office*